United States Patent
Stokes et al.

(10) Patent No.: US 10,422,369 B2
(45) Date of Patent: Sep. 24, 2019

(54) BOLT HAVING TORQUE RESISTANT SHEAR REGION

(71) Applicant: Halliburton Energy Services, Inc., Houston, TX (US)

(72) Inventors: Matthew Bradley Stokes, Keller, TX (US); David Joe Steele, Arlington, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/524,947

(22) PCT Filed: Feb. 23, 2016

(86) PCT No.: PCT/US2016/019046
§ 371 (c)(1),
(2) Date: May 5, 2017

(87) PCT Pub. No.: WO2017/146682
PCT Pub. Date: Aug. 31, 2017

(65) Prior Publication Data
US 2018/0347613 A1    Dec. 6, 2018

(51) Int. Cl.
| | |
|---|---|
| *E21B 29/00* | (2006.01) |
| *E21B 29/06* | (2006.01) |
| *F16B 31/02* | (2006.01) |
| *E21B 41/00* | (2006.01) |
| *E21B 7/06* | (2006.01) |

(52) U.S. Cl.
CPC ............ *F16B 31/021* (2013.01); *E21B 7/061* (2013.01); *E21B 29/002* (2013.01); *E21B 29/06* (2013.01); *E21B 41/0035* (2013.01)

(58) Field of Classification Search
CPC ....... F16B 31/021; E21B 29/002; E21B 29/06
USPC ...................................... 411/2, 3, 5
See application file for complete search history.

(56) References Cited

U.S. PATENT DOCUMENTS

| | | |
|---|---|---|
| 6,464,002 B1 | 10/2002 | Hart et al. |
| 6,719,045 B2 | 4/2004 | Hart et al. |
| 2002/0072750 A1* | 6/2002 | Jackson ............ A61B 17/7032 606/306 |
| 2010/0012322 A1 | 1/2010 | McGarian |
| 2010/0059279 A1 | 3/2010 | Saylor |
| 2014/0166367 A1 | 6/2014 | Campbell et al. |

(Continued)

FOREIGN PATENT DOCUMENTS

| | | |
|---|---|---|
| WO | WO 2012/142543 A2 | 10/2012 |
| WO | WO-2015053760 A1 | 4/2015 |
| WO | WO-2016076867 A1 | 5/2016 |

OTHER PUBLICATIONS

International Search Report and the Written Opinion of the International Search Authority, or the Declaration, dated Nov. 23, 2016, PCT/US2016/019046, 14 pages, ISA/KR.

(Continued)

*Primary Examiner* — David J Bagnell
*Assistant Examiner* — Dany E Akakpo

(57) ABSTRACT

Certain shear bolts described herein provide failure bending resistance when torque is applied to members being connected by the bolts, while maintaining shearability. Certain other shear bolts described herein provide a shear region having different shear limits dependent upon the direction of force being applied to the shear region.

12 Claims, 16 Drawing Sheets

(56) References Cited

U.S. PATENT DOCUMENTS

2014/0216819 A1    8/2014    Gregurek et al.
2015/0184460 A1    7/2015    Alsup et al.

OTHER PUBLICATIONS

Greg Nazzal, Hans Rehbock and Troy Miller, Development, Testing and Field History of a True One Trip Casing Exit System, SPE-35662, May 22-24, 1996, 10 pages, Society of Petroleum Engineers Inc., Anchorage, Alaska.

Patent Office of the Cooperation Council for the Arab States of the Gulf, Examination Report, Application No. GC 2017-32748, dated Nov. 14, 2018, 4 pages, Saudi Arabia.

\* cited by examiner

FIG. 2E
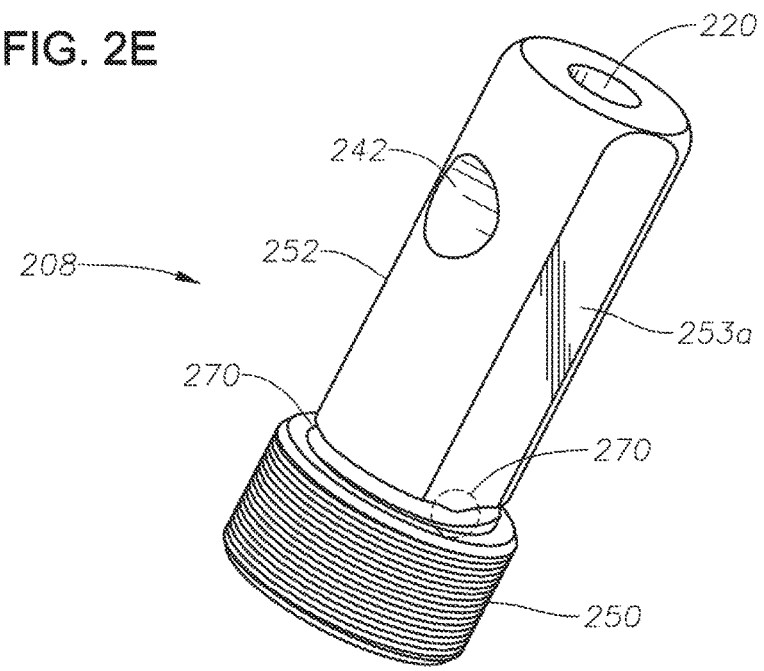
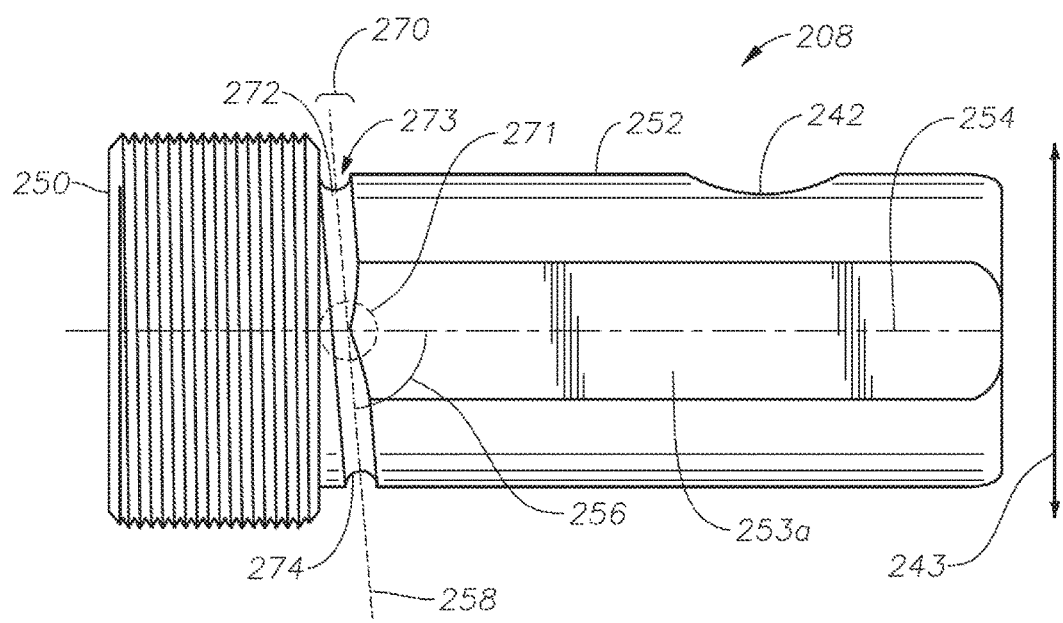
FIG. 2F

US 10,422,369 B2

BOLT HAVING TORQUE RESISTANT SHEAR REGION

PRIORITY

The present application is a U.S. National Stage patent application of International Patent Application No. PCT/US2016/019046, filed on Feb. 23, 2016, the benefit of which is claimed and the disclosure of which is incorporated herein by reference in its entirety.

FIELD OF THE INVENTION

The present invention relates generally to multilateral wells in the oil and gas industry and, more specifically, to improved torque support for mill and whipstock assemblies used to drill multilateral wells.

BACKGROUND

Hydrocarbons can be produced through relatively complex wellbores traversing a subterranean formation. Some wellbores can be a multilateral wellbore, which includes one or more lateral wellbores that extend from a parent or main wellbore. Multilateral wellbores typically include one or more windows or casing exits defined in the casing that lines the wellbore to allow corresponding lateral wellbores to be formed. More specifically, a casing exit for a multilateral wellbore can be formed by positioning a whipstock in a casing string at a desired location in the main wellbore. The whipstock is often designed to deflect one or more mills laterally relative to the casing string. The deflected mill(s) machines away and eventually penetrates part of the casing to form the casing exit through the casing string. Drill bits can be subsequently inserted through the casing exit in order to cut the lateral or secondary wellbore.

Single-trip whipstock designs allow a well operator to run the whipstock and the mills downhole in a single run, which greatly reduces the time and expense of completing a multilateral wellbore. Some conventional single-trip whipstock designs anchor a lead mill to the whipstock using a combination of a shear bolt and a torque lug. In general, the shear bolt is not designed to shear in torque. Rather, the shear bolt is designed to shear upon assuming a particular set down weight, in the axial direction, when a well operator desires to free the mills from the whipstock. In this configuration, however, features of a shear bolt that facilitate shearing may also render the shear bolt susceptible to premature shearing in torque. Such torque can fatigue the shear bolt and cause it to shear prematurely, thereby prematurely freeing the lead mill from whipstock.

BRIEF DESCRIPTION OF THE DRAWINGS

FIG. 2E depicts an isometric view of a shear bolt 208, according to certain illustrative embodiments of the present disclosure;

FIGS. 2F and 2G depict side views of the shear bolt;

FIG. 8A shows a shear bolt with a notch moved away from the shoulder 801, while

DESCRIPTION OF ILLUSTRATIVE EMBODIMENTS

Figure 1:
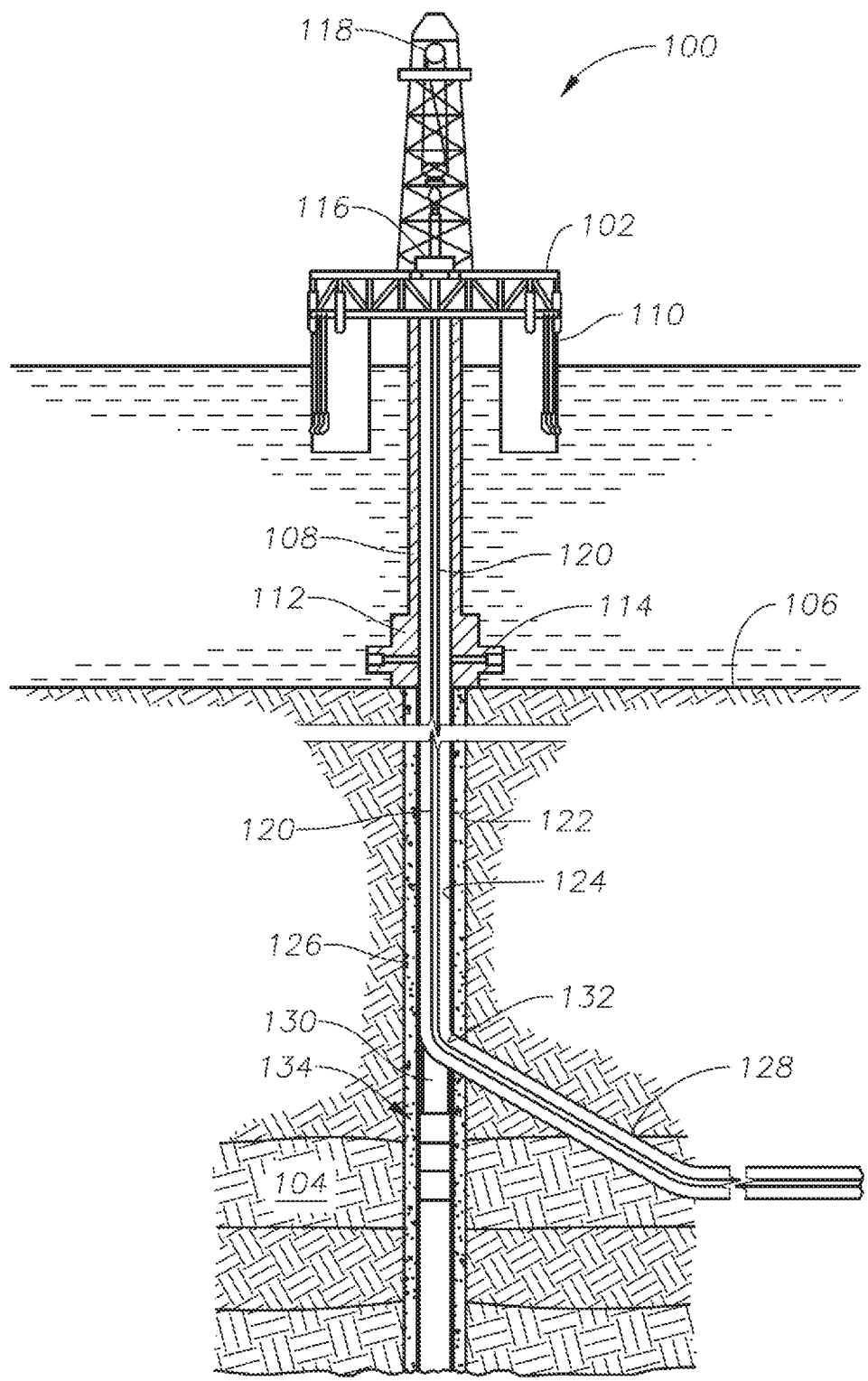
FIG. 1 is a well system that may employ the principles of the present disclosure, according to one or more illustrative embodiments.

Illustrative embodiments and related methods of the present invention are described below as they might be employed in a shear bolt and methods of using the same. In the interest of clarity, not all features of an actual implementation or method are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. Further aspects and advantages of the various embodiments and related methods of the disclosure will become apparent from consideration of the following description and drawings.

As described herein, illustrative embodiments of the present disclosure are directed to torque resistant shear bolts. In a generalized embodiment, the shear bolt includes a head and a main body, more particularly described herein as a bolt shaft or simply as a shaft, axially extending from the head and having a shear region. In general, the shear region is a portion of the main body, typically adjacent the head, comprising a reduced cross-sectional area relative to adjacent portions of the shaft to promote preferential shearing at the shear region. In the illustrated examples, the reducedcross-sectional area is embodied as a circumferentially-formed notch (which may be alternately described as a groove) to promote shearing at the notch in response to certain shearing forces applied during use of a whipstock assembly, for example. The reduced cross-sectional area portion (e.g., a notch) of the main body (e.g., a shaft) may have different shapes, and hence, the cross-sectional area of the shaft adjacent to the shear region may likewise have different shapes. The shaft further includes two flat faces on opposing sides extending from the shear region. A first flat face extending from the shear region is positioned along a first side of the shaft, while a second flat face extending from the shear region is positioned along a second side on an opposite side of the shaft. The use of the flat faces provides resistance to bolt failure when torsional forces are applied to members connected with the bolt. In other embodiments, the shear region has a profile area that has two different widths in orthogonal directions which provide differing shear thresholds. Through the use of the various illustrative embodiments described herein, improved shear bolts are provided.

Although described in relation to whipstock/milling assemblies, the illustrative shear bolts may be used in other applications and downhole assemblies where shear mechanisms are necessary. Nevertheless, when operated in a downhole environment, the shear bolt can be used to couple a whipstock to a mill. In such an application, the use of the first and second opposing flat faces reduce stress concentrations in the two areas of the bolt that experience the highest stress concentrations when torque is applied to the mill (and, thus, the shear bolt experiences combined loading, to include bending). Here, the notches and flat faces are aligned to provide controllable susceptibility to shear under forces along an axis of the mill (i.e., axial direction), while also providing controllable susceptibility to bolt failure induced by torque transmitted from the mill to the whipstock. Thus, the illustrative embodiments described herein allow more torque to be transmitted from a mill to a whipstock without risking failure of a shear bolt used to couple the lead mill to the whipstock. As a result, the whipstock is able to assume rotational, as well as axial thrust loads, without risking premature failure of the shear bolt and premature detachment of the lead mill within a wellbore.

Referring to FIG. 1, a well system 100 is shown that may employ the principles of the present disclosure, according to one or more illustrative embodiments. As illustrated, well system 100 may include an offshore oil and gas platform 102 centered over a submerged subterranean formation 104 located below sea floor 106. While well system 100 is described in conjunction with the offshore oil and gas platform 102, it will be appreciated that the embodiments described herein are equally well suited for use with other types of oil and gas rigs, such as land-based rigs or drilling rigs located at any other geographical site. Platform 102 may be a semi-submersible drilling rig, and a subsea conduit 108 may extend from deck 110 of platform 102 to a wellhead installation 112 that includes one or more blowout preventers 114. Platform 102 has a hoisting apparatus 116 and a derrick 118 for raising and lowering pipe strings, such as a drill string 120, within subsea conduit 108.

As depicted, a main wellbore 122 has been drilled through the various earth strata, including formation 104. The terms "parent" and "main" wellbore are used herein to designate a wellbore from which another wellbore is drilled. It is to be noted, however, that a parent or main wellbore is not required to extend directly to the earth's surface, but could instead be a branch of another wellbore. A string of casing 124 is at least partially cemented within main wellbore 122. The term "casing" is used herein to designate a tubular member or conduit used to line a wellbore. Casing 124 may actually be of the type known to those skilled in the art as "liner" and may be segmented or continuous, such as coiled tubing.

In some embodiments, a casing joint 126 may be interconnected between elongate upper and lower lengths or sections of casing 124 and positioned at a desired location within wellbore 122 where a branch or lateral wellbore 128 is to be drilled. The terms "branch" and "lateral" wellbore are used herein to designate a wellbore that is drilled outwardly from an intersection with another wellbore, such as a parent or main wellbore. Moreover, a branch or lateral wellbore may have another branch or lateral wellbore drilled outwardly therefrom at some point. A whipstock assembly 130 may be positioned within casing 124 and secured and otherwise anchored therein at an anchor assembly 134 arranged or near the casing joint 126. Whipstock assembly 130 may operate to deflect one or more cutting tools (i.e., mills) into the inner wall of casing joint 126 such that a casing exit 132 can be formed therethrough at a desired circumferential location. The casing exit 132 provides a "window" in casing joint 126 through which one or more other cutting tools (i.e., drill bits) may be inserted to drill and otherwise form lateral wellbore 128.

It will be appreciated by those ordinarily skilled in the art having the benefit of this disclosure that, even though FIG. 1 depicts a vertical section of main wellbore 122, the illustrative embodiments described herein are equally applicable for use in wellbores having other directional configurations including horizontal wellbores, deviated wellbores, or slanted wellbores. Moreover, use of directional terms such as above, below, upper, lower, upward, downward, uphole, downhole, and the like are used in relation to the illustrative embodiments as they are depicted in the figures, the uphole direction being toward the surface of the well and the downhole direction being toward the toe of the well.

Figure 2A:
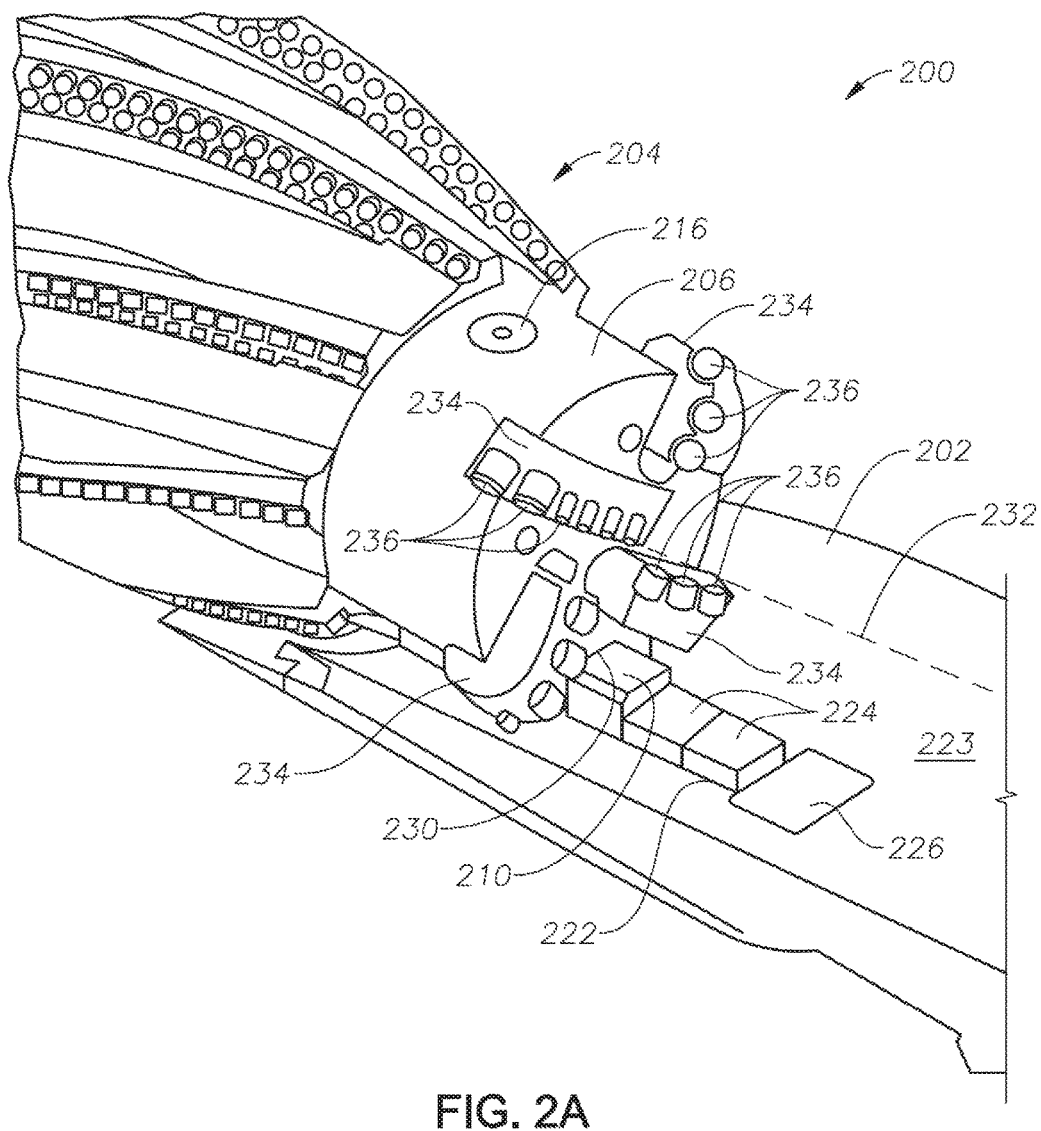
FIG. 2A depicts an isometric view of a whipstock assembly, according to certain illustrative embodiments of the present disclosure.
Figure 2B:
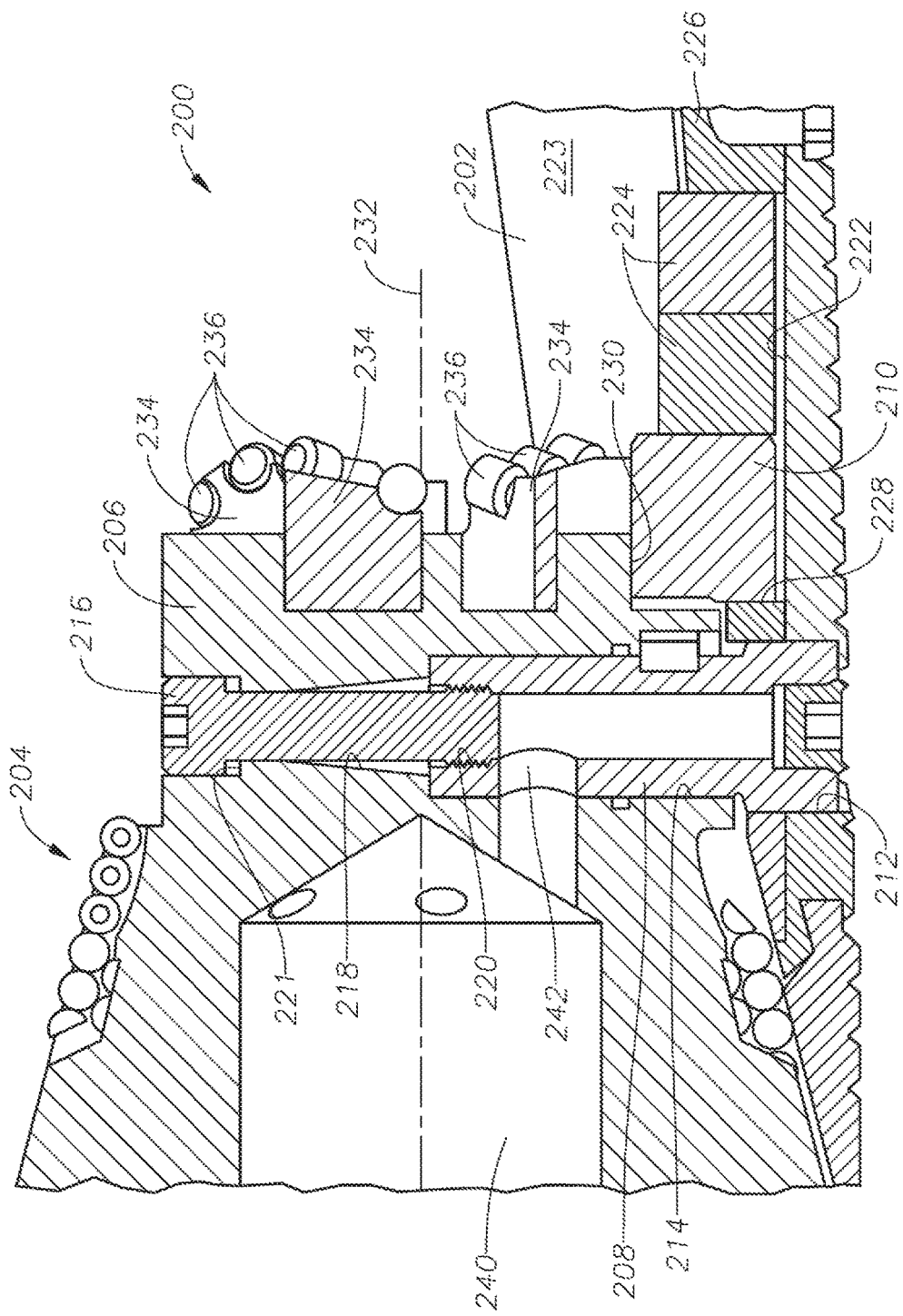
FIG. 2B depicts a cross-sectional side view of the whipstock assembly.

Referring now to FIGS. 2A and 2B, with continued reference to FIG. 1, illustrated are views of an illustrative whipstock assembly 200. More particularly, FIG. 2A depicts an isometric view of the whipstock assembly 200, and FIG. 2B depicts a cross-sectional side view of whipstock assembly 200. Whipstock assembly 200 may be similar to or the same as whipstock assembly 130 of FIG. 1 and, therefore, may be able to be lowered into wellbore 122 and secured therein to help facilitate the creation of casing exit 132 in casing 124.

As illustrated, whipstock assembly 200 may include a deflector or whipstock 202 and one or more mills 204. Mills 204 may include a lead mill 206 configured to be coupled or otherwise secured to whipstock 202. More particularly, lead mill 206 may be secured to whipstock 202 using a shear bolt 208 (FIG. 2B) as described herein, and a torque lug 210. As will be described in more detail below, shear bolt 208 is configured to shear or otherwise fail upon assuming a predetermined axial load provided to lead mill 206, while also providing increased resistance to rotational torque. Torque lug 210 may provide lead mill 206 with additional rotational torque resistance that helps prevent the shear bolt 208 from fatiguing prematurely in torque as whipstock assembly 200 is run downhole.

As best seen in FIG. 2B, in some embodiments, shear bolt 208 may extend through and be threaded into a threaded aperture 212 defined through the underside of whipstock 202. The threads on aperture 212 mate with threads on the head of shear bolt 208. Shear bolt 208 may further extend into a shear bolt aperture 214 defined in lead mill 206, where threaded aperture 212 and shear bolt aperture 214 are configured to axially align to cooperatively receive shear bolt 208 therein. Shear bolt 208 may be secured within lead mill 206 with a retaining bolt 216 that is extendable into a retaining bolt aperture 218 defined in the lead mill 206. As illustrated, retaining bolt aperture 218 may be aligned with and otherwise form a contiguous portion of shear bolt aperture 214. Retaining bolt 216 may be threadably secured to the shear bolt 208 at a threaded cavity 220 defined in the end of the shear bolt 208, and the head of the retaining bolt 216 may rest on a shoulder 221 defined in the retaining bolt aperture 218. With shear bolt 208 threadably secured to whipstock 202 and retaining bolt 216 threadably secured to shear bolt 208 at threaded cavity 220, lead mill 206 (and any other mills 204) may thereby be securely coupled to whipstock 202.

Torque lug 210 may be a solid metal block made of, for example, aluminum or another easily millable material. Torque lug 210 may be arranged within a longitudinal groove 222 defined in a ramped surface 223 of whipstock 202. Torque lug 210 may be arranged within longitudinal groove 222 along with one or more bumper members 224 (two shown) and a whipstock plate 226. More particularly, bumper members 224 may be made of a pliable or flexible material, such as rubber or an elastomer, and whipstock plate 226 may be configured to bias the bumper members 224 against torque lug 210 so that torque lug 210 is correspondingly urged against an axial end wall 228 of longitudinal groove 222. Torque lug 210 may further be configured to be inserted or otherwise extended into a slot 230 defined in lead mill 206. As arranged within slot 230, torque lug 210 may be configured to prevent lead mill 206 (or mills 204 generally) from rotating about a central axis 232.

Figure 2C:
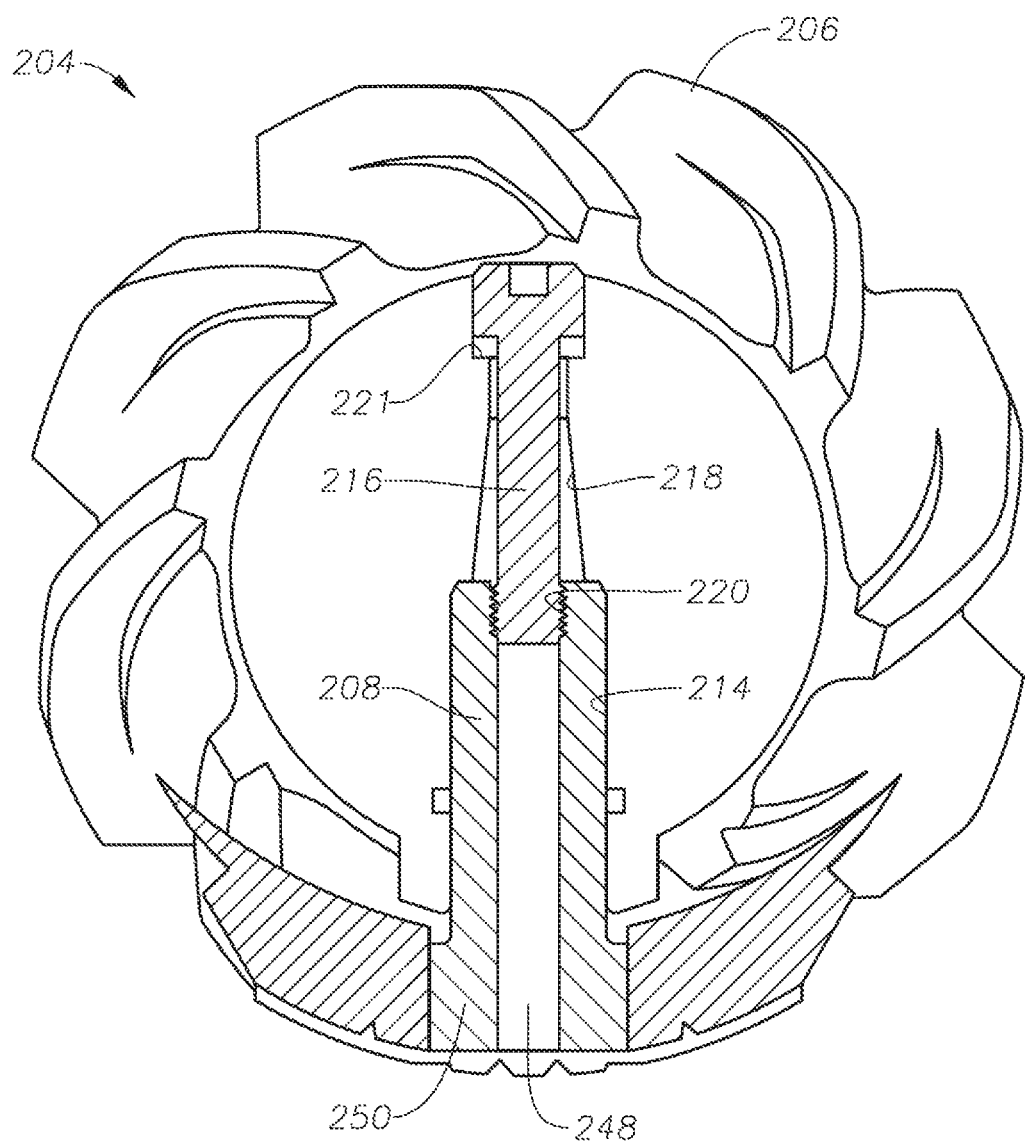
FIG. 2C depicts a cross-sectional end view of the whipstock assembly.
Figure 2D:
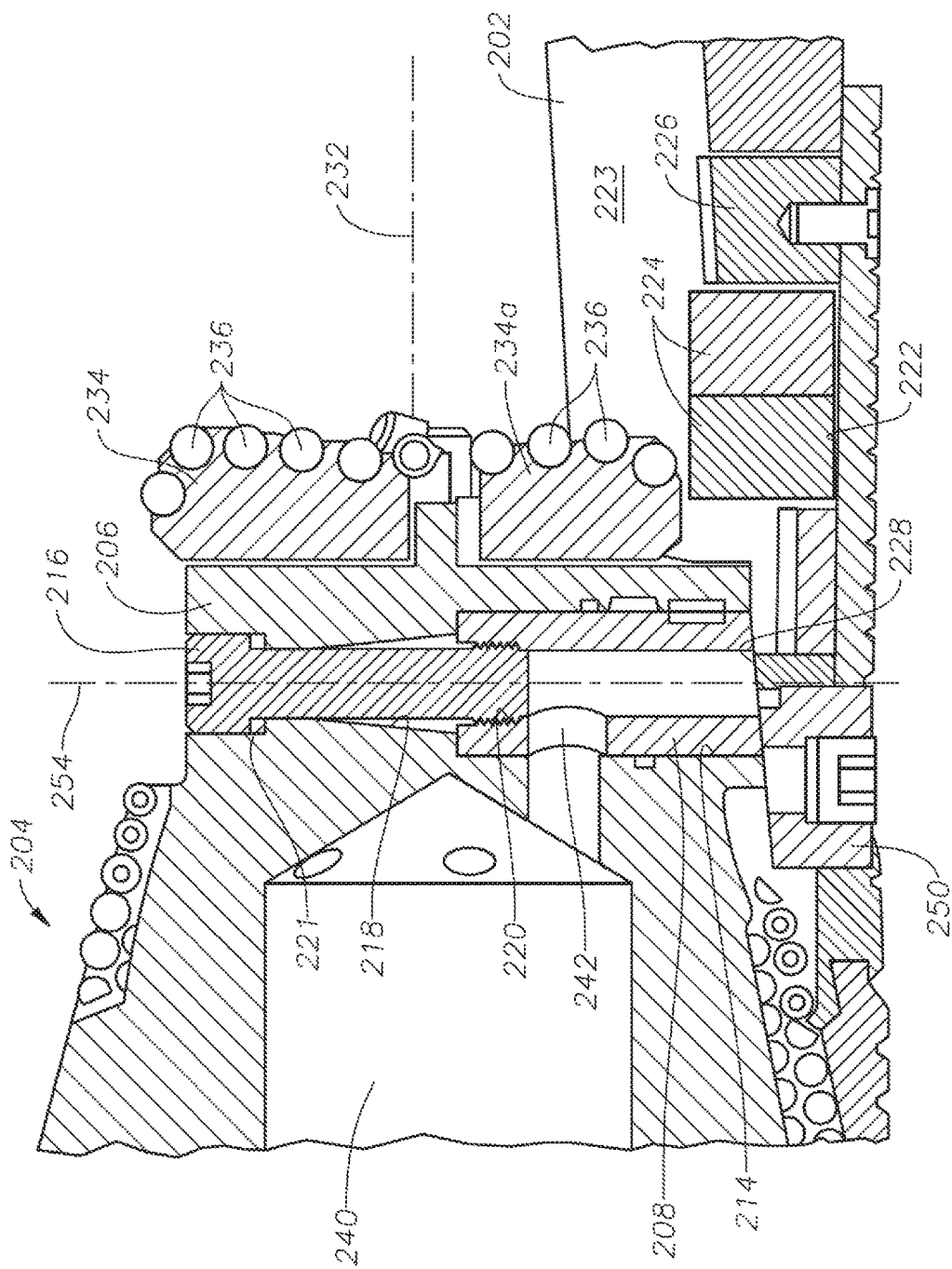
FIG. 2D depicts a cross-sectional side view of the whipstock assembly in a sheared configuration.

FIG. 2C depicts a cross-sectional end view of the whipstock assembly 200, and FIG. 2D depicts a cross-sectional side view of the whipstock assembly 200 in a sheared configuration. Shear bolt 208 may have an internal bolt channel 248 into which retaining bolt 216 can engage shear bolt 208 at the location of threaded cavity 220. The internal bolt channel 248 of shear bolt 208 can be provided in fluid communication with an internal mill channel 240 via a side port 242 of the shear bolt 208. The orientation of the shear bolt 208 that places the side port 242 of shear bolt 208 in alignment with an opening to internal mill channel 240 corresponds to an orientation of the shear region with respect to whipstock 202. As shown in FIG. 2D, shear bolt 208 is oriented such that a central axis 254 of shear bolt 208 is orthogonal to a central axis 232 of mills 204 (including lead mill 206). Retaining bolt 216 may be similarly oriented, such that a central axis of retaining bolt 216 coincides with central axis 254 of shear bolt 208.

In an illustrative downhole operation, and with continued reference to FIGS. 1-2D, whipstock assembly 200 may be lowered downhole within wellbore 122 with mills 204 secured to whipstock 202 as generally described above. Upon reaching a location in the wellbore 122 where casing exit 132 is to be formed, whipstock assembly 200 may be latched into anchor assembly 134 (FIG. 1) previously arranged within wellbore 122. Latching in whipstock assembly 200 may include extending whipstock assembly into anchor assembly 134 and then rotating whipstock assembly 200 as whipstock assembly 200 is pulled back uphole or toward the surface. As whipstock assembly 200 is rotated, the radially opposing flat face configuration, as will be described in detail below, reduces the stress concentrations in areas of the bolt that typically experience the highest stresses caused in bending, thereby providing resistance to premature failure when the mill and whipstock are in torque.

Once whipstock assembly 200 is properly latched into anchor assembly 134, weight is set down on whipstock assembly 200 from a surface location. Placing weight on the whipstock assembly 200 may provide an axial load to lead mill 206, which transfers a predetermined axial load to shear bolt 208. Upon assuming predetermined axial load, shear bolt 208 may shear or otherwise fail, and thereby free mills 204 from axial engagement with whipstock 202, as shown in FIG. 2D.

With the weight still applied on lead mill 206, torque lug 210 may be forced against the bumper members 224 in the downhole direction (i.e., to the right in FIG. 2B), and the bumper members 224 may provide an opposing biasing resistance to torque lug 210 in uphole direction (i.e., to the left in FIG. 2B). Mills 204 (including lead mill 206) may then be pulled back in the uphole direction a short distance, and bumper members 224 may then urge torque lug 210 back against the axial end wall 228. Once free from whipstock 202, mills 204 may then be rotated about the central axis 232 and simultaneously advanced in the downhole direction. As mills 204 advance downhole, they ride up ramped surface 223 of whipstock 202 until engaging and milling the inner wall of casing 124 to form casing exit 132.

As illustrated, lead mill 206 may include one or more blades 234 (four shown) and a plurality of cutters 236 secured to each blade 234. In the above-described configuration, lead mill 206 may pivot on the torque lug 210 upon assuming a torsional load. Such torsional loads may be generated while latching in the whipstock assembly 200, as described above, or while lowering the whipstock assembly 200 downhole through portions of the wellbore 122 (FIG. 1) that require the whipstock assembly 200 to be rotated. Torsional loads applied to whipstock assembly 200 may result in lead mill 206 pivoting on torque lug 210 and one of the blades 234 that contacts the ramped surface 223 of whipstock 202. As a result, a lift force may be generated that places tensile and/or torsional loading on shear bolt 208, which, if not properly mitigated, could fatigue shear bolt 208 and otherwise causes it to fail prematurely. However, as described herein, certain illustrative embodiments of shear bolts described herein combat such failure.

According to the present disclosure, embodiments of improved shear bolts allow more torque to be transmitted from lead mill 206 to whipstock 202 without shearing or otherwise compromising the structural integrity of shear bolt 208. As described herein, the improved shear bolts are designed to provide axial shearing capability while preventing the shear bolt from fatigue or premature failure in torque.

Figure 2G:
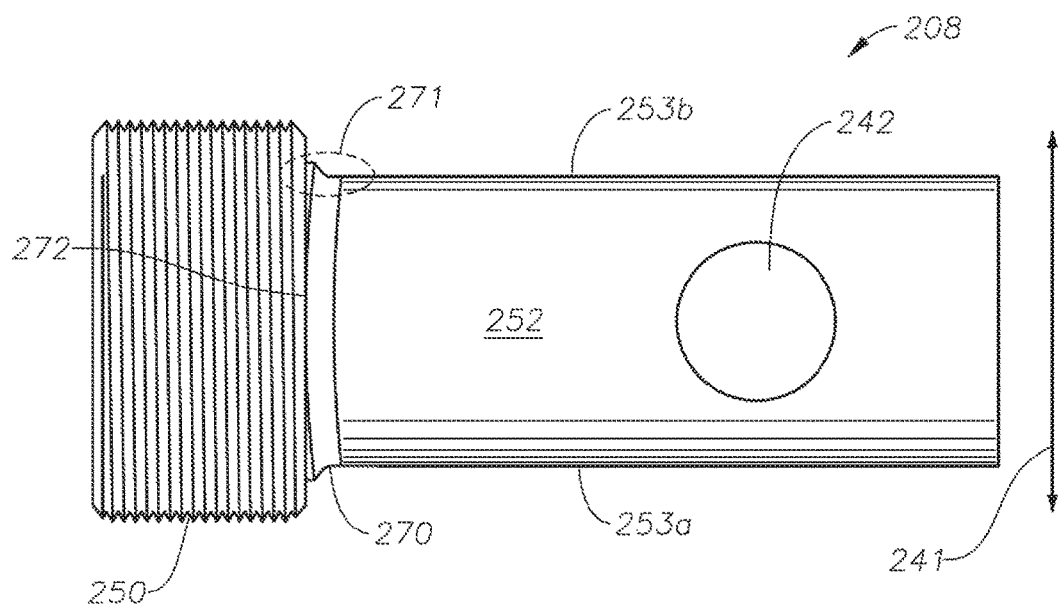

Now that a generalized method has been described, a more detail description of the shear bolt features will now be provided. Referring now to FIGS. 2E-2G, with continued reference to FIGS. 1-2D, illustrated are various views of an illustrative shear bolt 208, according to one or more embodiments of the present disclosure. More particularly, FIG. 2E depicts an isometric view of shear bolt 208, and FIGS. 2F and 2G depict side views of shear bolt 208. The shear bolt 208 may include a threaded head 250 and a shaft 252. The shaft 252 includes a shear region 270. In one or more embodiments, the main body is a substantially circular shaft having a substantially smooth outer surface. The shear region 270 in this illustrated embodiment more specifically includes the portion of shaft 252 adjacent head 250 in which one or more notches 273 are formed in the body and extend radially inward to define a cross-sectional shear area 272 or 274 of the body adjacent or between notches which will form a point of shearing in response to a shear force applied in a direction transverse to central axis 254. In alternate embodiments, shear bolt 208 may include an alignment guide (not shown) along shaft 252 that can be aligned with a corresponding guide (e.g., pin) of mills 204 (e.g., in FIG. 2A), wherein such an alignment corresponds to a desired orientation of shear region 270.

As best seen in FIG. 2F, shear region 270 includes at least one notch 273 with a radially inward intrusion from a radially outer periphery of head 250 and/or shaft 252. Notch 273 lies along a plane 258 extending transversely through the central axis 254 of the shear bolt 208. Angle 256 may be perpendicular or acute, such that plane 258 is oblique with respect to central axis 254. In one embodiment, angle 256 may be a specific angle within a range of between 30° to 150°. In another embodiment, angle 256 may be a specific angle within a range from 60° to 120°. In yet another embodiment, angle 256 may be 90° (+/−5%). Thus, in any given embodiment, angle 256 may be greater than 60°, less than 90°, and/or equal to 90°.

As best seen in FIG. 2F, shear region 270 includes at least a cross-sectional shear area 272 of the shaft 252 adjacent notch 273, where the cross-sectional area is generally the cross-sectional face of shaft 252 that lies along plane 258. The first and second cross-sectional shear areas 272 and 274 can be defined on radially opposite sides of shaft 252 and central axis 254. In one or more embodiments, the cross-sectional shear areas 272, 274 may be separate, while in other embodiments, the cross-sectional areas between the two notches may be contiguous having a uniform cross-sectional area. It will be appreciated that the shape of any given cross-sectional shear area is defined by the adjacent notch 273, and is thus dependent on the shape and dimensions of notch 273. The axial locations of the first and second cross-sectional shear areas 272, 274 can be different, to define a plane 258 that is oblique with respect to the central axis 254. Accordingly, cross-sectional shear area 272 can be axially closer to an end of shear bolts 208 formed by head 250, and second cross-sectional shear area 274 can be axially closer to an end of shear bolt 208 formed by the shaft 252.

As best seen in FIG. 2D, the angle 256 may correspond to an angle of the ramped surface 223 of the whipstock 202 with respect to a central axis 232 of mills 204. For example, angle 256 may be complementary with respect to an angle of ramped surface 223. Such a configuration provides a shear region 270 that forms an angle similar to that of the ramped surface 223, to provide a smooth transition. In other embodiments of the present disclosure, the shear region 270 may be aligned in any other desired orientation such that its shear strength is high in one direction, while lower in other directions.

Figure 2H:
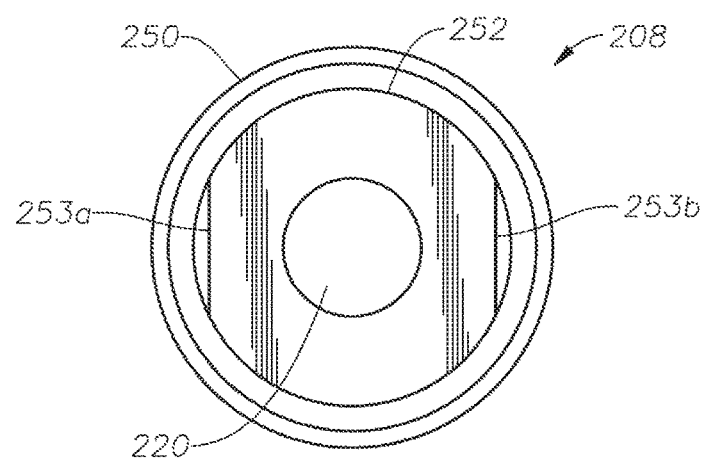
FIG. 2H depicts an end view of the shear bolt 208 (from the end of main body)

With reference to FIGS. 2E-2H, shear bolt 208 also includes opposing flat faces 253a and 253b on radially opposite sides of shaft 252. FIG. 2H depicts an end view of shear bolt 208 (from the end of shaft 252). In this illustrative embodiment, flat faces 253a and 253b extend from shear region 270 to the end of shaft 252. However, in alternative embodiments, flat faces 253a, 253b may not extend the entire length of shaft 252. Flat faces 253a, 253b may extend into shear region 270 to converge with a notch 273 (a continuous notch in this example) as shown in area 271, thus forming an area of reduced stress concentration. In conventional shear bolts (e.g., those without the flat faces described herein), area 271 is where the torque bending forces are highest during operations. However, through the use of flat faces 253a, 253b, the stress applied at area 271 is reduced because of the geometrical change brought about through use of faces 253a,b. Also note that, although one area 271 is identified in the figures, there are two areas 271—one corresponding to flat face 253a, and the other to flat face 253b. In one or more embodiments, at least one face 253 converges with notch 273.

Flat faces 253a, 253b provide a geometrical change to body 252 that reduces the stress concentration factor at areas 271. As described above, plane 258 along which shear region 270 is defined, transverses, or intersects, central axis 254. Flat faces 253a, 253b provide resistance to bolt failure in response to forces applied in a direction 241 (FIG. 2G) that transverses flat faces 253a,253b (i.e., torsional forces). At the same time, however, shear region 270 may still be sheared when an axial force is applied along direction 243 (FIG. 2F) that is orthogonal to direction 241 (but still transverses central axis 254). Shear bolt 208 is positioned to couple the whipstock and mill such that direction 241 is the torque direction, while direction 243 is the direction of the shearing weight down axial force. As a result, resistance to failure in torsion is provided, while maintaining the shearability of shear region 270.

Figure 2I:
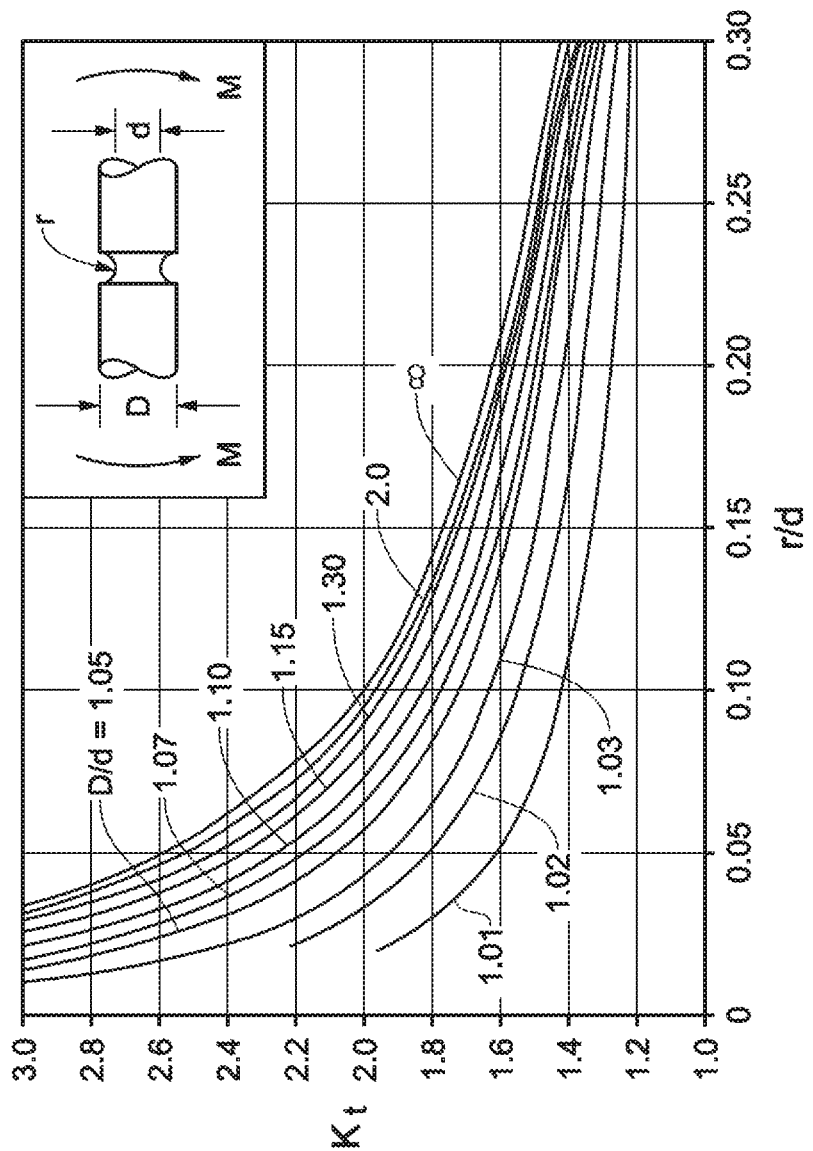
FIG. 2I shows the geometric stress-concentration factor for a notched shaft in bending.
Figure 2J:
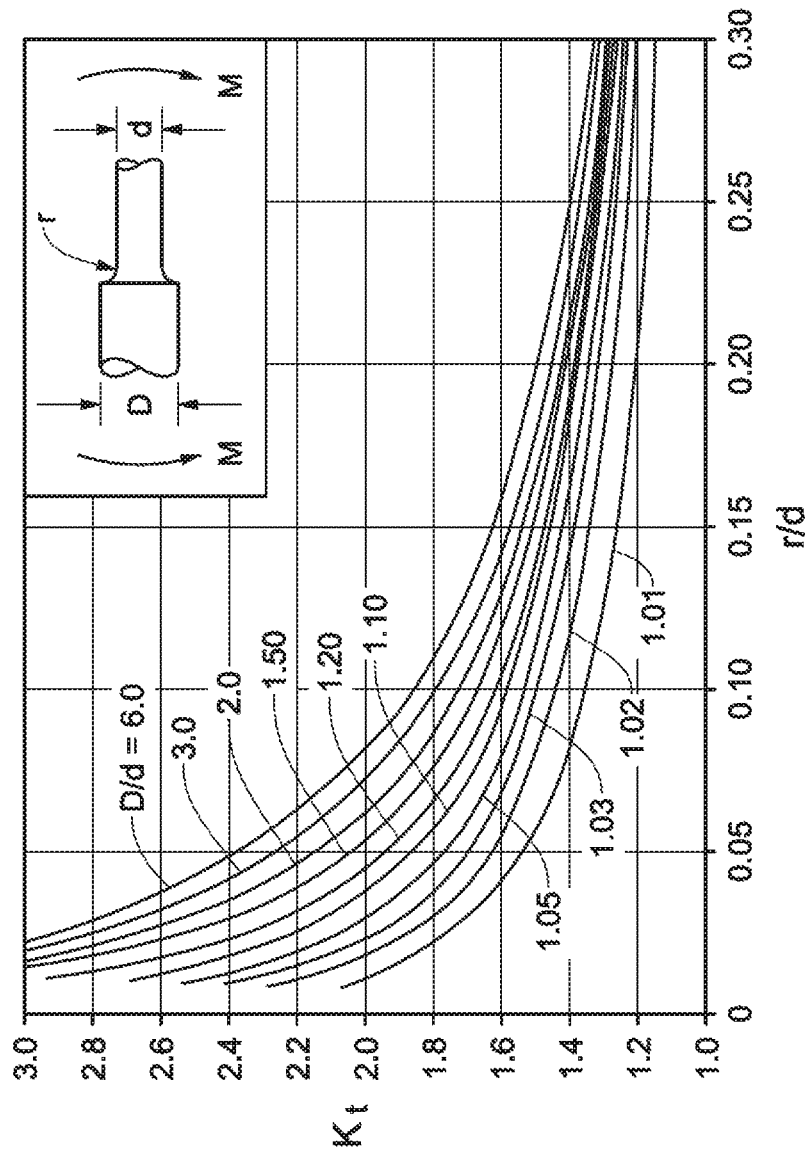
FIG. 2J shows the geometric stress-concentration factor for a shaft with a shoulder fillet in bending.

As stated, flat faces 253a,253b reduce the stress concentration in areas 271 due to geometrical considerations. The total stress ($\sigma_{tot}$) seen at any point inside the shear notch of the shear bolt is:

$$\sigma_{tot} = K_t \sigma_{nom} \qquad \text{Eq. (1),}$$

where $\sigma_{nom}$ is the nominal stress at the point in question, and $K_t$ is the stress concentration factor at the same point. As shown in Eq. 1, by reducing this stress concentration factor, the total stress developed at this point is can be reduced. The stress concentration factor $K_t$ is purely a function of the geometry of the body in question. The relationship between part geometry and $K_t$ can be seen in the graphs of FIGS. 2I and 2J. FIG. 2I shows the geometric stress-concentration factor $K_t$ for a groove shaft in bending, while FIG. 2J shows the geometric stress-concentration factor $K_t$ for a shaft with a shoulder fillet in bending. It should be noted that, in the illustrative embodiments described herein, the outer diameter (D) and the inner diameter (d) must remain unchanged.

FIG. 2I shows how, when (D/d) remains constant, the stress concentration factor $K_t$ decreases as (r/d) increases. For example: when D/d=1.01 (the bottom line of the graph in FIG. 2I) and r/d=0.05, then $K_t$ is approximately 1.6. Then, when r/d increases, to 0.15 for example, $K_t$ decreases to a value closer to 1.35. The value of r/d increases in direct proportion to the value of r. Therefore, as r increases, r/d increases, and the stress concentration factor $K_t$ decreases, which leads to a reduction in total stress as shown in Eq. 1.

Furthermore, if all variables then remain constant, but the overall form of the body changes, from a notched shaft (FIG. 2I), to a shaft with a shoulder fillet (FIG. E-2), then the stress concentration factor $K_t$ is further reduced. Using the last values from the example above (D/d=1.01 and r/d=0.15) with the graph of the shaft with the shoulder fillet (FIG. 2J), it is shown that $K_t$ is reduced from around 1.35 (from FIG. 2I) to 1.25 (from FIG. 2J).

Conventional shear bolt designs have the same geometry around the entire circumference of the bolt, similar to that shown in FIG. 2I. Because of this, the same stress concentration factor is used to determine total stress ($\sigma_{tot}$), regardless of what direction the bolt is bending. In situations where a shear bolt is typically bent in one direction, or experiences greater bending in one direction, it is desirable to have a shear bolt with the lowest stress concentration factor in the area where the most stress is developed during bending; such an area is described herein as area 271.

Moreover, in alternate embodiments of the present disclosure, shear region 270 is comprised of a notch having an expanded radius. The expanded notch radius improves the bending resistance in all directions by significantly reducing the stress concentration factor. When this embodiment is combined with the flat faces described herein, the stress concentration is even further reduces at areas 271 (FIGS. 2E-2G). Nevertheless, in those embodiment where the notch has an expanded radius, the stress concentration factor is reduced in all directions by increasing r around the full circumference of the bolt. There is no formula for determining the value of r, it is simply increased as much as possible, without change to D or d. Furthermore, the stress concentration factor in the areas experiencing the most stress (area 271 in FIG. 2E) is further reduced by changing the geometry here from the notched shaft model of FIG. 2I, to the shouldered shaft model of FIG. 2J. This difference can be seen by viewing feature 271 in FIG. 2G. This is accomplished by removing the sides of the shear bolt (features 253a and 253b of FIGS. 2E and 2G).

Such changes combine to create a shear bolt that develops less stress in all directions when compared to conventional shear bolts exposed to the same loads, especially in the two directions that experience the greatest stress during normal operation. Such designs provide an advantage because the shear bolt described herein are now directional (more resistant to bending in a particular direction). Also, the shear bolt was made stronger by removing material as opposed to adding material, which is counterintuitive.

In finite element analysis ("FEA") of embodiments of the present disclosure using the flat faces, a 33% reduction in maximum stresses were seen when compared to conventional shear bolts. In addition, the stresses encountered at the extreme side of the shear bolt (area 271), typically the area of maximum stress concentration, were reduced by approximately 41% as compared to conventional shear bolts.

Figure 3A:
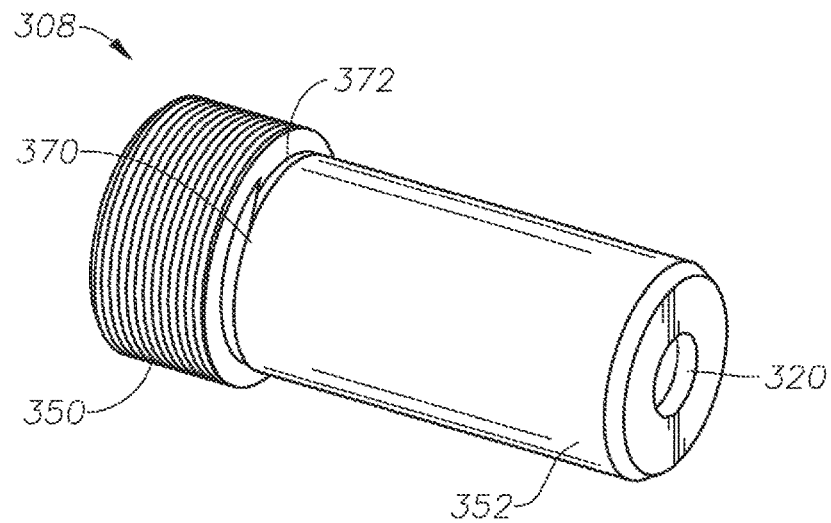
FIG. 3A depicts an isometric view of a shear bolt, according to certain alternative embodiments of the present disclosure.
Figure 3B:
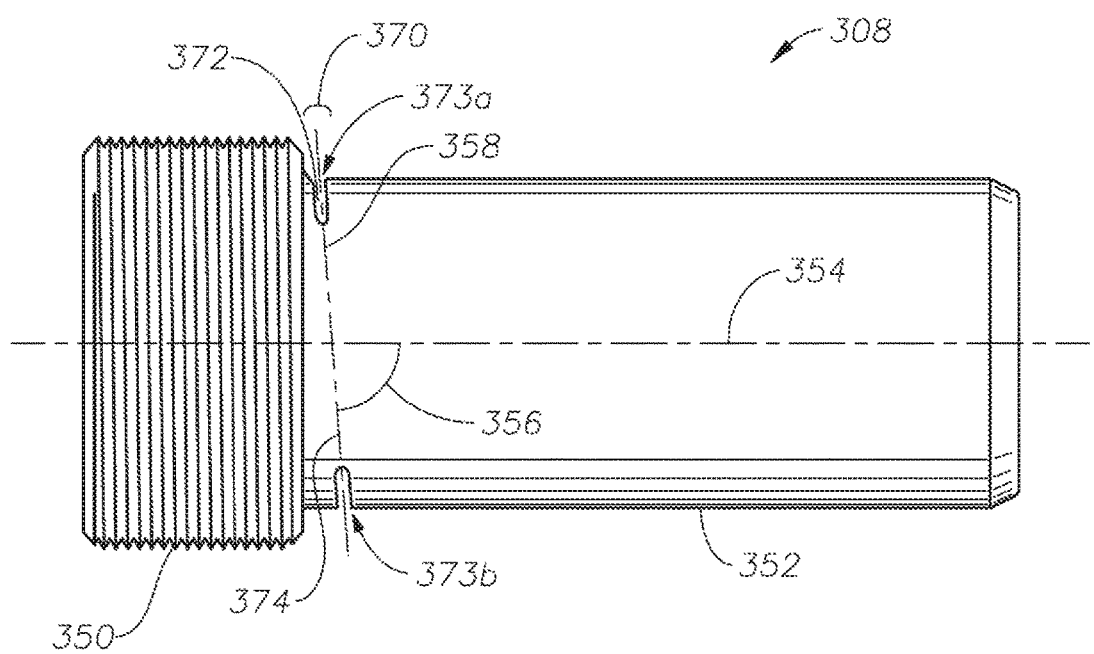
FIGS. 3B and 3C depict side views of the shear bolt of FIG. 3A.
Figure 3C:
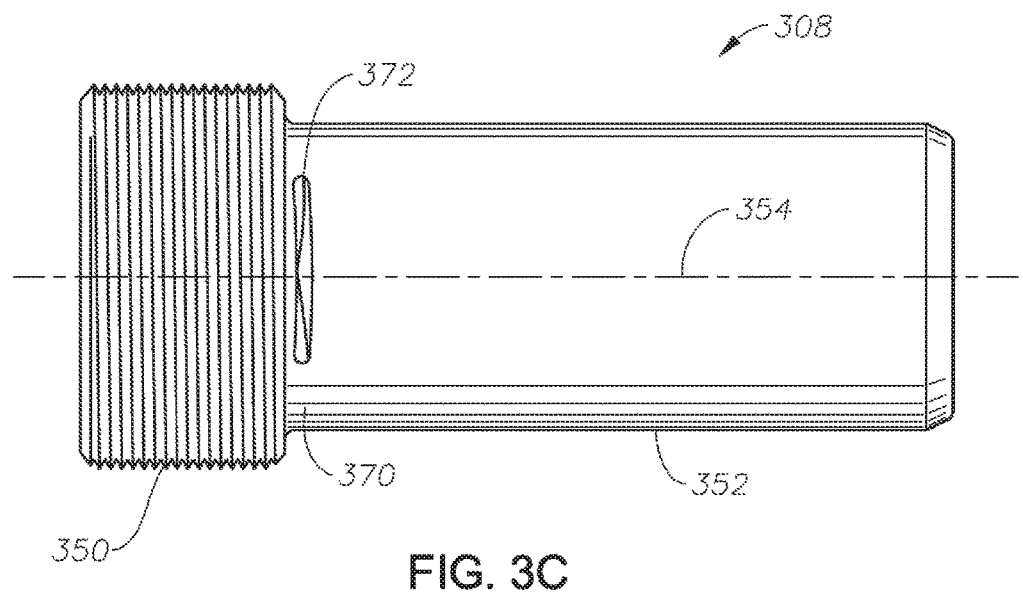
Figure 3D:
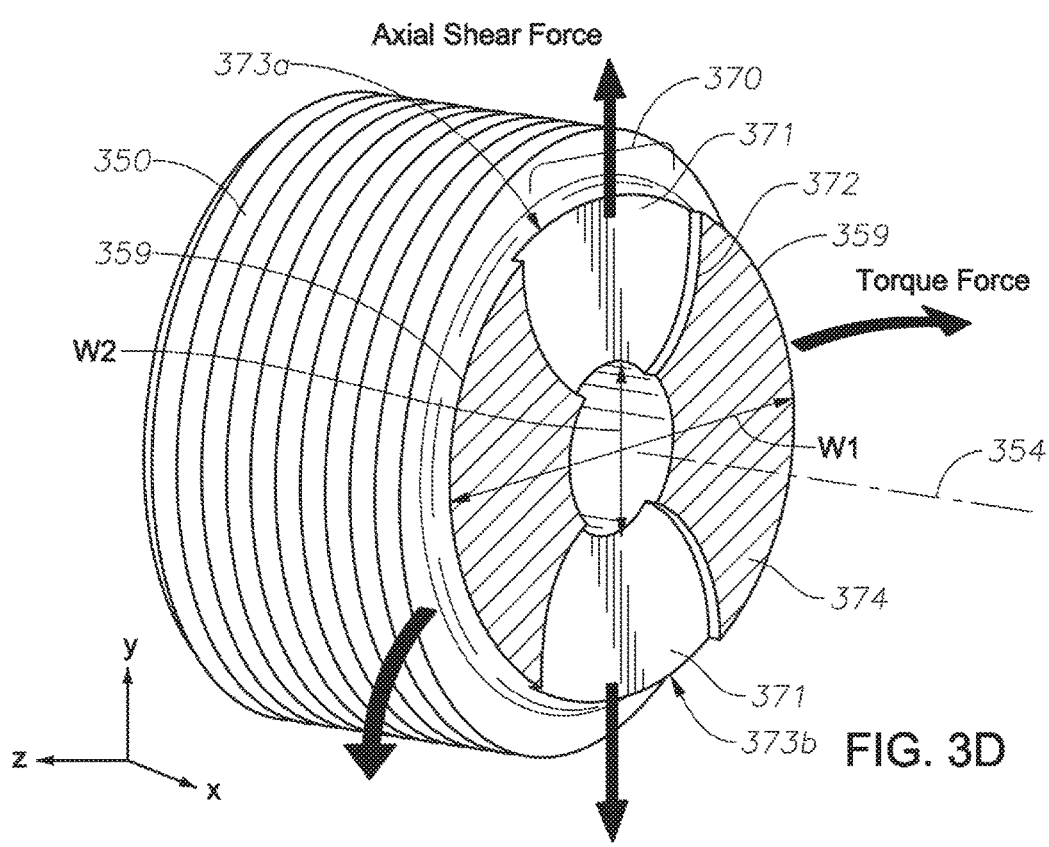
FIGS. 3D and 3E are isometric views cut along the shear region (to illustrate the shear plane profiles) of the shear bolt of FIG. 3A.
Figure 3E:
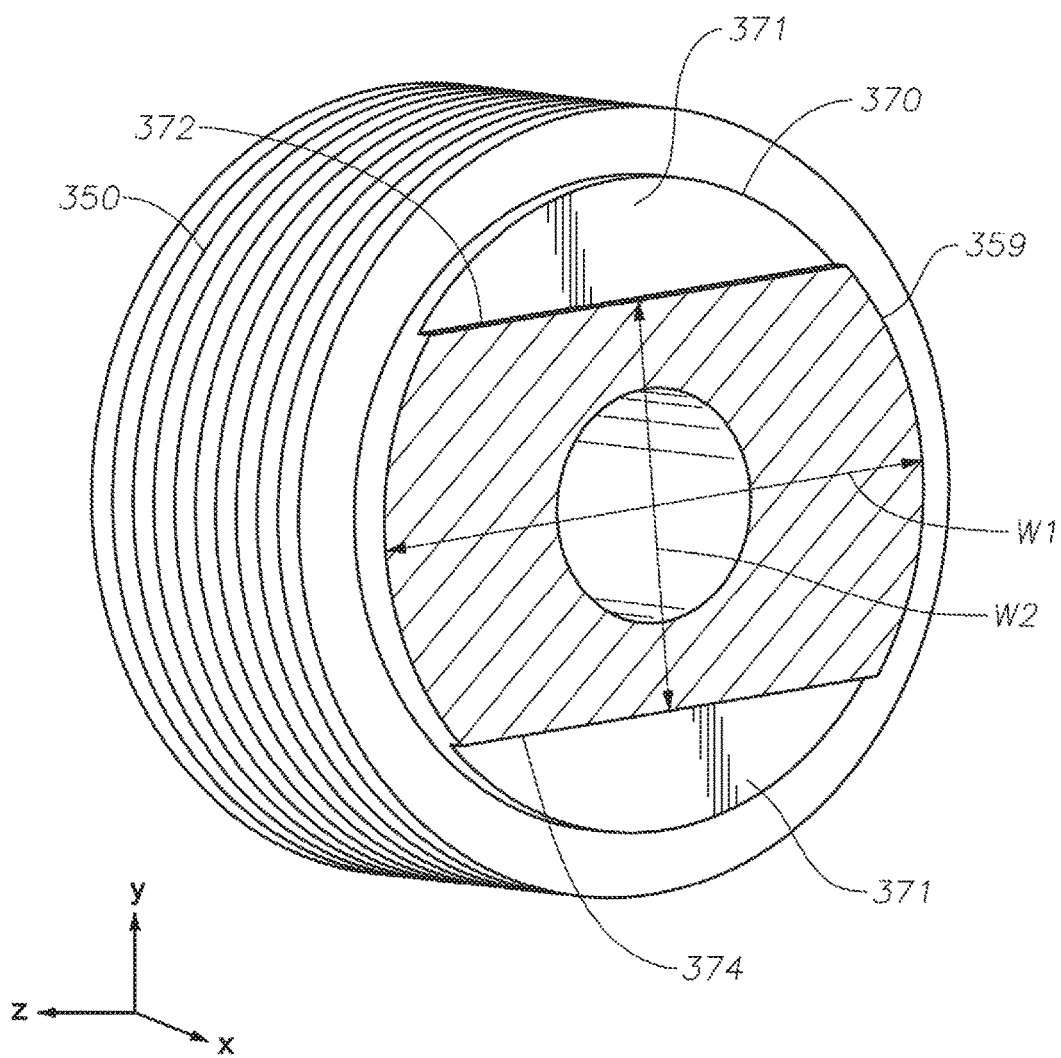

FIGS. 3A-3E are various views of an illustrative shear bolt 308, according to one or more alternate embodiments of the present disclosure having a shear region that provides different shear limits. More particularly, FIG. 3A depicts an isometric view of the shear bolt 308, FIGS. 3B and 3C depict side views of shear bolt 308, and FIGS. 3D and 3E are isometric views cut along the shear region (to illustrate the shear plane profiles 359). Shear bolt 308 of FIGS. 3A-3E may be, in some respects, similar to the shear bolt 208. For example, shear bolt 308 may include a head 350 and a shaft 352, separated by a shear region 370. Moreover, shear bolt 308 may include a threaded cavity 320. Shear bolt 308 can further include an alignment guide (not shown) that can be aligned with a corresponding guide (e.g., pin) of mills 204, wherein such an alignment corresponds to a desired orientation of shear region 370.

As best seen in FIG. 3B, shear region 370 may be formed with two separate notches 373 axially offset in relation to one another. For example, shear region 370 can include a first notch 373a, on a first side of shaft 252, that defines a first cross-sectional shear area 372 of shaft 352 and a second notch 373b, on a second side of shaft 252, that defines a second cross-sectional shear area 374 of shaft 352. In some embodiments, second notch 373b is 180° apart from the first notch 373a on the periphery of shaft 352. Shear region 370 may include one or a plurality of notches. Each of the notches 373 is more particularly characterized by a radially inward intrusion 371 (FIGS. 3D and 3E) from a radially outer periphery of head 350 and/or the shaft 352, thereby forming the second cross-sectional shear areas 372, 374. Together, the cross-sectional shear areas 372, 374 form a shear plane profile 359. Intrusion 371, and hence notches 373, are not limited to a particular shape. In some embodiments, the shape of intrusions 371 may be rounded as shown in FIG. 3D, while in other embodiments, the shape of intrusions 371 may be straight, as shown in FIG. 3E. In alternative embodiments, intrusions 371 may take a variety of other shapes, and more than two intrusions 371/notches 373 may be utilized.

Each of the notches 373 of a shear region 370 may extend only partially circumferentially about the central axis 354, such that the notches 373, and in particular, the intrusions 371 do not connect or otherwise intersect. Accordingly, notches 373a, 373b produce cross-sectional shear areas 372, 374 lying in plane 358 that traverses central axis 354. As shown in FIGS. 3D and 3E, cross-sectional shear areas 372, 374 form a shear plane profile 359 having a first width W1 in a first direction, and a second width W2 in a second direction orthogonal to the first direction, both widths W1 and W2 measured through central axis 354. Note that in this particular illustrated embodiment, the width of W2 essentially is 0; however, in alternative embodiments other shapes may be used which provide intrusions 371 having a width W2 larger than 0. As previously described, intrusions 371 may be flat (FIG. 3E), concave, convex, and/or undulating, for example. The cross-section shear areas 372, 374 along shear plane profile 359 can also define a non-circular shape (in other words, the shape of shaft 352 may be non-circular. Although not shown, shear bolt 308 may also include flat faces as previously described. In such embodiments, the flat faces will be positioned on the radial sides corresponding to width W1.

A cross-sectional shear area, such as areas 372, 374, may lie in or otherwise be defined along plane 358 extending entirely through shear bolt 308. Plane 358 may form an angle 356 with respect to central axis 354 of shear bolt 308. Angle 356 may be the smallest angle formed by the intersection of plane 358 and central axis 354. Angle 356 may be perpendicular or acute, such that plane 358 is oblique with respect to central axis 354. In one or more embodiments, angle 356 may range from approximately 30° to approximately 150°, while in other embodiments, angle 356 may range from approximately 60° to approximately 120°, and it still yet other embodiments, angle 356 may be approximately 90°. For example, angle 356 may be greater than 60°, less than 90°, and/or equal to 90°.

As best seen in FIG. 3B, first and second notches 373a, 373b can be positioned on radially opposite sides of central axis 354. The axial locations of first and second notches 373a, 373b can be different, to define a plane 358 that is oblique with respect to central axis 354. Accordingly, first notch 373a can be axially closer to an end of shear bolts 308 formed by head 350, and second notch 373b can be axially closer to an end of shear bolt 308 formed by shaft 352.

FIGS. 3D and 3E are illustrative of possible uniquely shaped shear plane profiles 359 formed by notches 373a, 373b and intrusions 371. As can be seen, the area of shear plane profile 359 is greater in the direction of rotational torsion (parallel to W1) to increase the ability of the shear bolt to resist shearing in torsion, but still maintain the required shear area along the direction parallel to W2 to provide the desired amount of shear force (i.e., 80,000-lbs) in the axial direction. As a result, by manipulating the width of profile 359, shear region 370 provides two different shear limits: a first shear limit corresponding to the wider width (high shear limit in the torsional direction, e.g.) and a second shear limit, lower than the first shear limit, corresponding to second smaller width (lower shear limit in the axial direction, e.g.).

The areas of shear plane profile 359 shown in FIGS. 3D and 3E are only representative in nature, as many other shapes may be utilized. For example, the two-part shear plane in FIG. 3D derived from cross-sectional shear areas 372, 374 may be joined together into a single contiguous cross-sectional shear area. The shape of the shear plane profile may take a variety of forms, resulting in a variety of different shear tolerances in different directions. During analysis of embodiments of the present disclosure, the shear planes shown in FIGS. 3D and 3E were analyzed. It was discovered that, although both shear plane areas have the same area, A=0.964 in$^2$, the Moment of Inertia ("MOI") was higher for the shear plane of FIG. 3D. The MOI of the cross-sectional shear area about the Y-axis in FIG. 3D was found to be 0.306-in$^2$, while the MOI of the cross-sectional shear area in the Y-axis in FIG. 3E was found to be 0.159 in$^2$.

In order to determine the area necessary in both directions for shear plane profile 359, the required cross-sectional shear area necessary for the shear bolt to shear at the desired shear force is calculated:

$$S = \frac{F}{A}, \quad \text{Eq (2)}$$

Where S=Ultimate Shear Strength; F=Applied Load (lbs); and A=Area of material subjected to load (in$^2$). Equation 1 is then rearranged to solve for the Area A as:

$$A = \frac{F}{S}. \quad \text{Eq. (3)}$$

Typically the strength of materials is expressed in Tensile Strength and Yield Strength, therefore a relationship between Tensile Strength and Shear Strength is used (S=0.75 UTS, where UTS is Ultimate Tensile Strength).

As an example, for a shear bolt made of a material with a Ultimate Tensile Strength of 138,300-psi to fail in shear at a force of 100,000-lbs, the required area, A would be:

$$A = \frac{F}{S} = \frac{F}{0.75\ UTS} = \frac{100{,}000\ \text{lbs}}{.75 * 138{,}300\ \text{psi}} = 0.964\ \text{in}^{\wedge}2$$

Therefore, in this example, across-sectional shear area, A, of 0.964 in$^2$ would be required to attain a shear force of 100,000-lbs. Once the required cross sectional shear area, A, is determined, then shape of the cross-sectional shear area, namely the shear plan profile, can be determined.

As previously described, the shear bolt is subjected to a bending stress when the mill and whipstock are being rotated. The bending stress of the shear bolt is similar to the bending stress in a beam. The formula for determining the bending stress in a beam under simple bending is:

$$\sigma = \frac{My}{Ix} \quad \text{Eq. (4)}$$

Where σ=bending stress; M=the moment about the neutral axis; y=the perpendicular distance to the neutral axis; and I$_x$=the second moment of area about the neutral axis x.

Figure 4A:
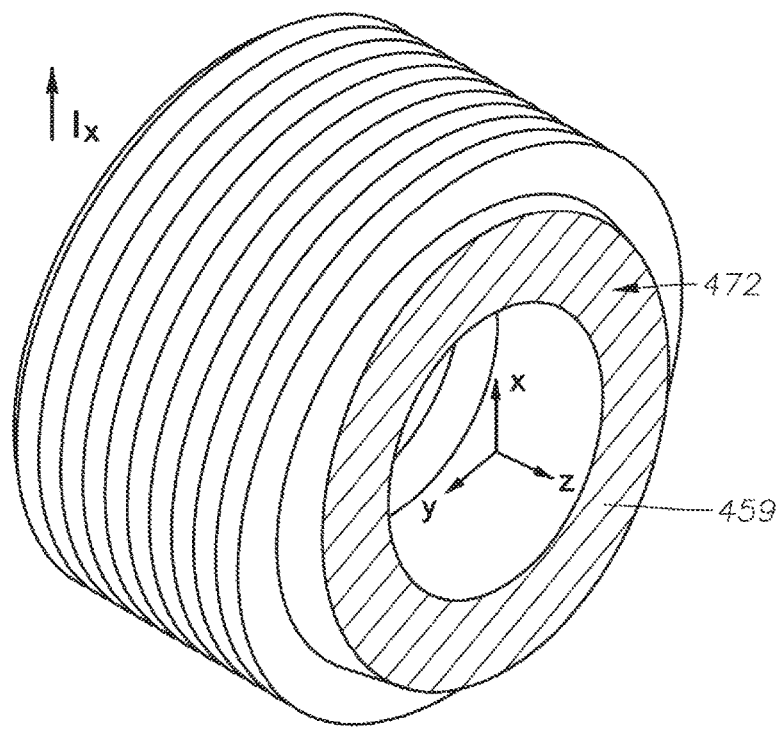
FIGS. 4A and 4B are isometric views cut along the shear regions (to illustrate alternative shear plane profiles), according to certain illustrative embodiments of the present disclosure.

Using the bending stress formula and y-value and I$_x$ values obtained using the CAD modeling of a cross-sectional shear area 472 shown in FIG. 4A, the maximum bending stress is determined as:

$$\sigma = \frac{My}{Ix} = \frac{M\frac{1.375}{2}}{0.154} = 4.464\ M$$

This indicates that the maximum bending stress in the shear bolt of FIG. 4A will be 4.464 times the bending moment. In FIG. 4A, the CAD modeling data used was: Area=0.964 in$^2$; centroid relative to output coordinate system origin in inches (x=1.029; y=0.0; z=0); moments of inertia of the area, at the centroid in inches$^4$ (Lxx=0.308; Lyx=0.013; Lzx=0; Lxy=0.013; Lyy=0.155; Lzy=0; Lxz=0; Lyz=0; Lzz=0.155); polar moment of inertia of the area, at the centroid=0.309 inches$^4$; and the principle moments of inertia of the area, at the centroid in inches$^4$ (Ix=0.154; Iy=0.155).

Figure 4B:
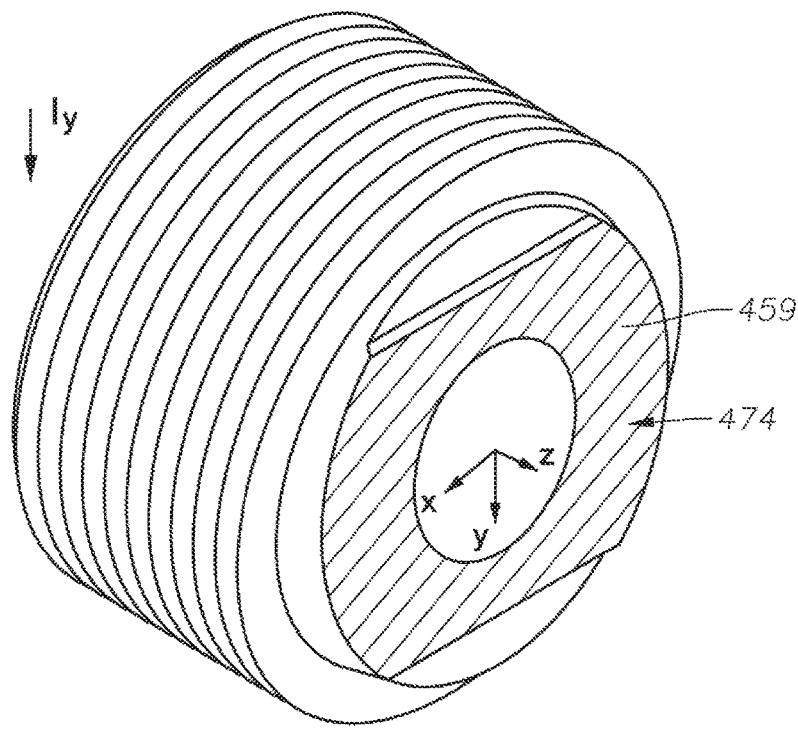

The following example illustrates the optimization of the shear bolt's shear plane's profile to reduce the bending stress while maintaining the same shear value of 100,000-lbs by having the same cross-sectional shear area, 0.964-in$^2$. FIG. 4B illustrates the illustrative cross-sectional shear area 474 and shear plane profile 459 and CAD modeling results. The CAD modeling data used here was an Area=0.964 in$^2$; centroid relative to output coordinate system origin in inches (x=1.029; y=0; z=0); moments of inertia of the area, at the centroid in inches$^4$ (Lxx=0.253; Lyx=0.008; Lzx=0; Lxy=0.008; Lyy=0.160; Lzy=0; Lxz=0; Lyz=0; Lzz=0.095); polar moment of inertia of the area, at the centroid=0.254 inches$^4$; principle moments of inertia of the area, at the centroid in inches$^4$ (Ix=0.095; Iy=0.159); and the moments of inertia of the area, at the output coordinate system in inches$^4$ (LXX=0.253; LYX=−0.008; LZX=0; LXY=−0.008; LYY=1.180; LZY=0; LXZ=0; LYZ=0; LZZ=1.115). Note that the neutral axis in the model is the y-axis as indicated in FIG. 4B. The distance y used in this example is ½ the diameter of the shear area's OD of 1.375-inches. Applying Equation 4:

$$\sigma = \frac{My}{Iy} = \frac{M\frac{1.375}{2}}{0.159} = 4.324\ M$$

where σ=bending stress; M=the moment about the neutral axis; y=the perpendicular distance to the neutral axis; and I$_y$=the second moment of area about the neutral axis y. Comparing the results of the two examples, the stress is reduced by {1−(4.324 M/4.324 M)}*100=2.52%.

To illustrate the illustrative methods to a further degree, the following illustration shows how the method can be used to decrease the bending stress to a greater degree. Again, the same shear plane area, 0.964-in$^2$ is used to maintain a shear force of 100,000-lbs to shear the bolt. However, in the following example, the second moment of area is increased considerably and the perpendicular distance to the neutral axis is increase too; both aid in decreasing the bending stress as will be shown below.

Figure 5A:
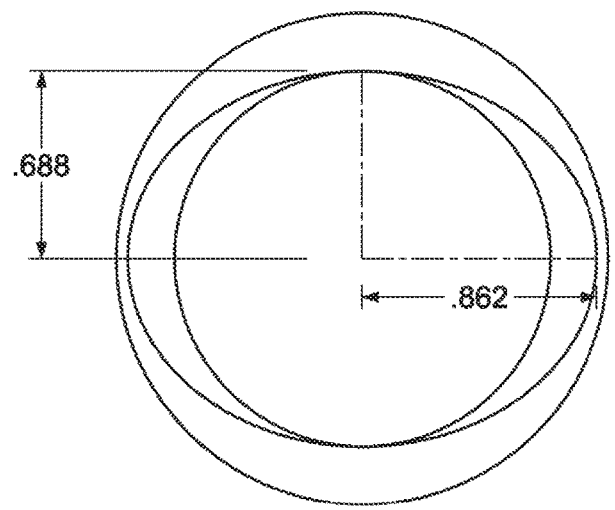
FIGS. 5A and 5B show other illustrative cross-sectional shear areas and profiles, along with an illustrative CAD modeling result.
Figure 5B:
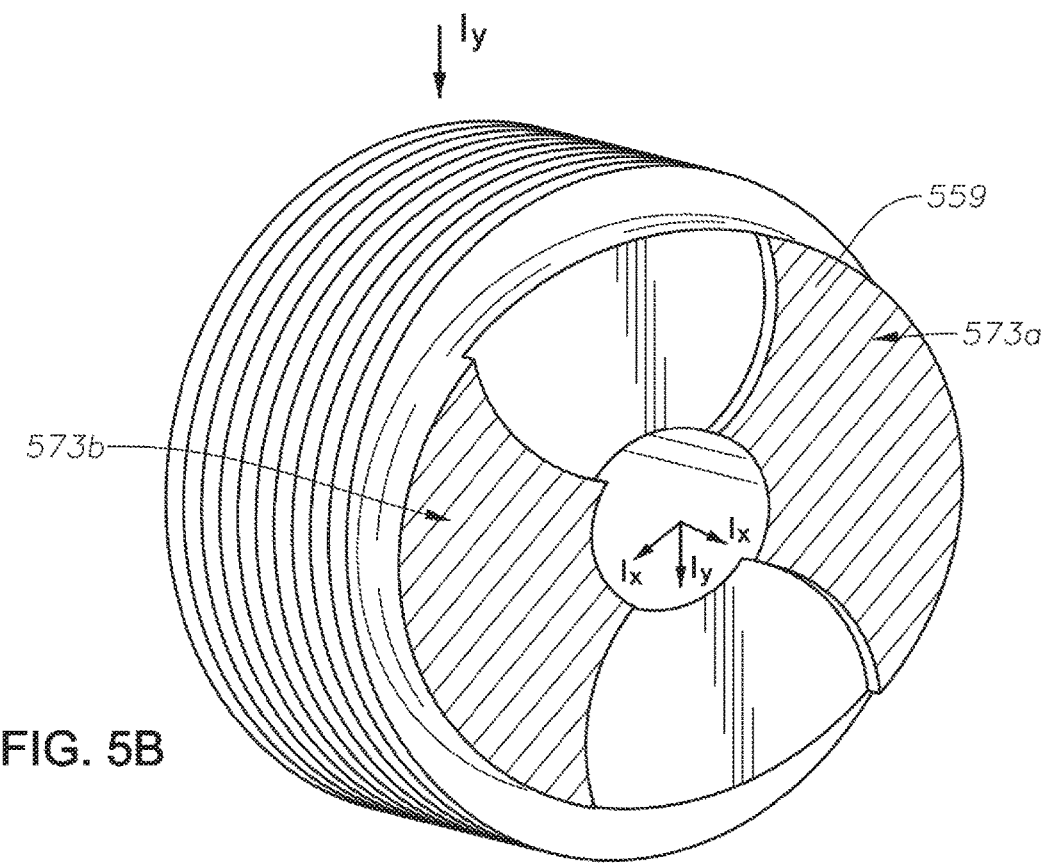

FIGS. 5A and 5B show another illustrative cross-sectional shear areas 573a, 573b and shear plan profile 559, along with an illustrative CAD modeling result. In FIG. 5B, the CAD modeling data used was: Area=0.964 in²; centroid relative to output coordinate system origin in inches (x=1.064; y=0.001; z=0); moments of inertia of the area, at the centroid in inches⁴ (Lxx=0.368; Lyx=0.005; Lzx=0; Lxy=0.005; Lyy=0.307; Lzy=0; Lxz=0; Lyz=0; Lzz=0.063); polar moment of inertia of the area, at the centroid=0.369 inches⁴; and the principle moments of inertia of the area, at the centroid in inches⁴ (Ix=0.063; Iy=0.306). In this example, the body of the shear bolt is in the shape of an oval: this provides an increase in the distance y which will decrease the bending stress. Applying Equation 4 in this example:

$$\sigma = \frac{My}{Iy} = \frac{M \cdot .862}{0.306} = 2.817 \, M$$

where σ=bending stress; M=the moment about the neutral axis; y=the perpendicular distance to the neutral axis; and $I_y$—the second moment of area about the neutral axis y. Comparing the results, the stress is reduced by {1−(2.817 M/4.324 M)}*100=36.50%.

Figure 6A:
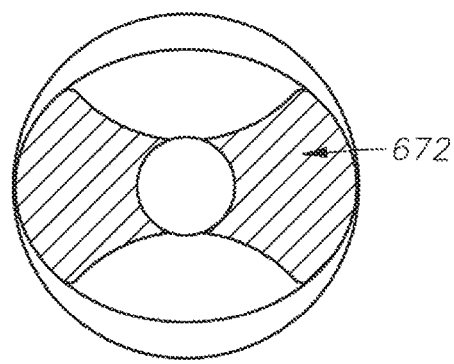
FIGS. 6A and 6B show further examples of cross-sectional shear areas and the related shear plane profile.
Figure 6B:
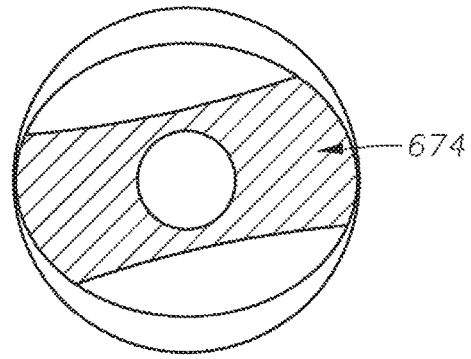

The above examples are shown only as examples to illustrate the advantages of optimizing the shape of the cross-sectional shear area to decrease the bending stresses while maintaining the desired shear force to fail the shear bolt. In alternative embodiments, other shear plan profiles or shapes may be used and optimized for manufacturability and combinational loads, such as, for example, torque and axial forces applied simultaneously. FIGS. 6A and 6B show further examples of cross-sectional shear areas, 672, 674, respectively, and the related shear plan profile 659, e.g., the shapes of the cross-sectional shear areas. In FIG. 6A, the illustrated cross-sectional shear area 672 is easier to manufacture since the radii are larger. FIG. 6B illustrates another example for the cross-sectional shear area 674 whereby the shear plane is rotated slightly from the major axis of the oval profile.

In the example of FIGS. 6A and 6B, Equation 4 is valid only when the stress at the extreme fiber (i.e., the portion of the beam farthest from the neutral axis) is below the yield stress of the material from which it is constructed. At higher loadings the stress distribution becomes non-linear, and ductile materials will eventually enter a plastic hinge state where the magnitude of the stress is equal to the yield stress everywhere in the beam, with a discontinuity at the neutral axis where the stress changes from tensile to compressive. This plastic hinge state is typically used as a limit state in the design of steel structures. Likewise, the plastic hinge state may be used to analyze the stresses in a shear bolt. Various techniques may be used to analyze a plastic hinge state, such as, for example, Finite Element Analysis (FEA). However, conducting a laboratory shear test will provide the best analysis and verification of the design.

Figure 7:
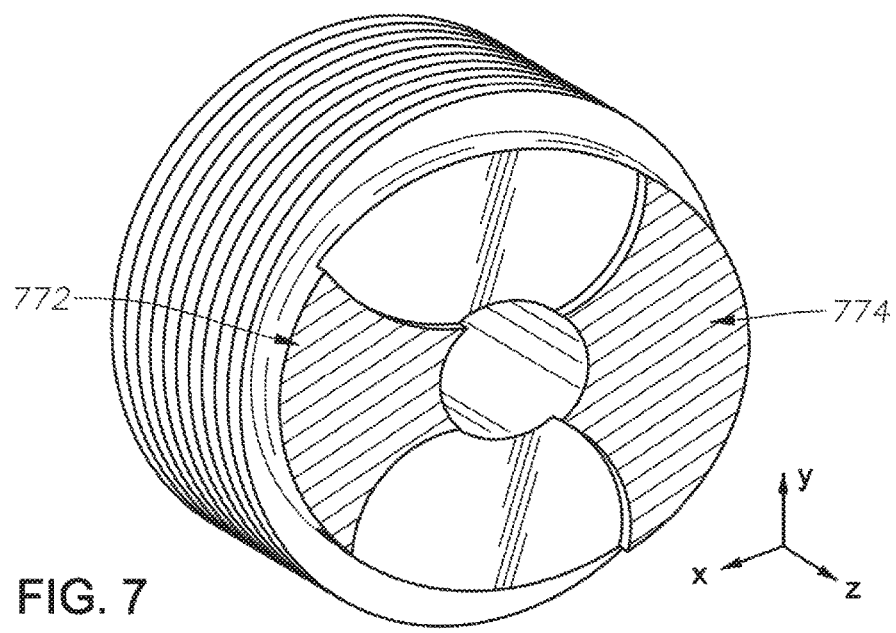
FIG. 7 illustrates a non-symmetric cross-sectional shear area, according to certain illustrative embodiments of the present disclosure.

In yet other embodiments, the cross-sectional shear area(s) 772, 774 may be non-symmetrical about the bending axis of the shear bolt, as shown in FIG. 7. The advantage of this embodiment is that when in a plastic hinge state where the magnitude of the stress is equal to the yield stress everywhere in the beam, the discontinuity moves off of the neutral axis and the location where the stress changes from tensile to compressive is shifted. This is advantageous when a combination of forces and bending moments causes the net bending moment, M, to shift from the neutral axis.

Figure 8A:
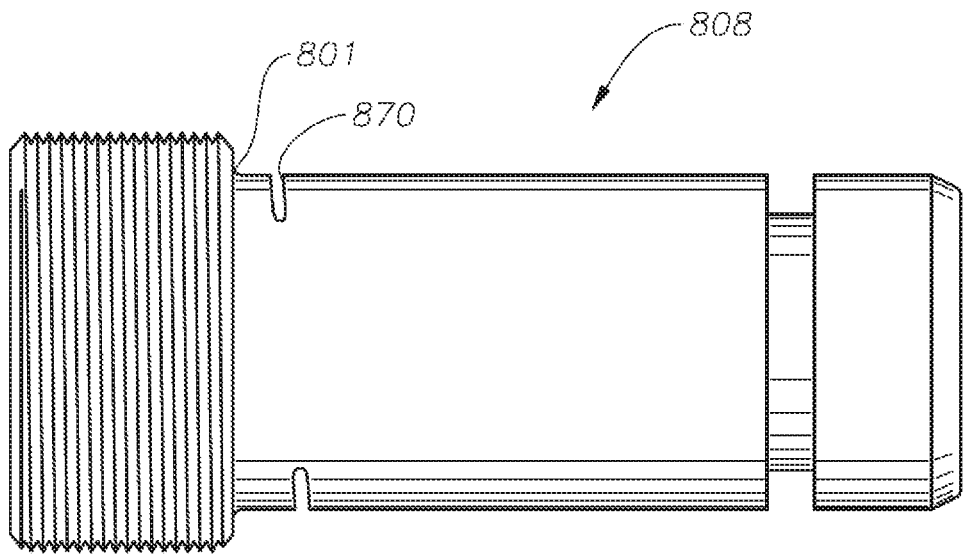
Figure 8B:
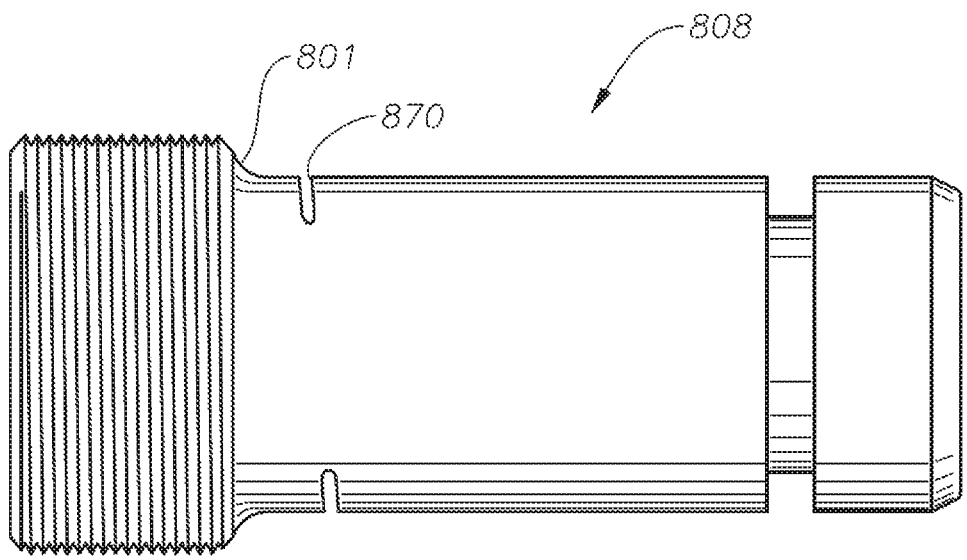
FIG. 8B shows another shear bolt with a notch moved away from the shoulder (and the radius of the shoulder has been doubled), according to certain illustrative embodiments of the present disclosure.

In another example, moving the shear plane away from the shoulder will reduce the stress concentration factor and allow the radius in the shoulder to be increased—as can be seen in the graph of FIG. 2J. FIG. 8A shows a shear bolt 808 with a notch 870 moved away from shoulder 801, while FIG. 8B shows a shear bolt 808 with a notch 870 moved away from shoulder 801 and the radius of shoulder 801 has been doubled. In FIG. 8A, the radius of shoulder 801 is 0.06 inches, while shoulder 801 of FIG. 8B is 0.12 inches. By expanding the radius of shoulder 801 in FIG. 2B, the stress concentration factor is further reduced, as can be seen in FIG. 2J.

Accordingly, the illustrative shear bolts described herein provide bending resistance in all directions through use of the shear regions having notches and cross-sectional shear areas as described herein, while providing improved resistance in the torque force direction, and still maintaining compatibility with conventional downhole tools. Moreover, any of the features described herein may be combined as desired.

Embodiments and methods of the present disclosure described herein further relate to any one or more of the following paragraphs:

1. A shear bolt, comprising a head; and a shaft extending from the head and defining a central axis, the shaft having a shear region comprising a reduced cross-sectional area axially spaced from the head and lying in a plane orthogonal to the central axis, the cross-sectional area having a profile including a first width in a first direction; and a second width, less than the first width, in a second direction orthogonal to the first direction.

2. A shear bolt as defined in paragraph 1, wherein the cross-sectional area of the shear region at the first width comprises a first shear limit to withstand a force applied in the first direction; and the cross-sectional area of the shear region at the second width comprises a second shear limit, lower than the first shear limit, to withstand a force applied in the second direction.

3. A shear bolt as defined in paragraphs 1 or 2, wherein the reduced cross-sectional area of the shear region comprises a circumferential notch formed in the shaft.

4. A shear bolt as defined in any of paragraphs 1-3, wherein the notch partially extends around the shaft.

5. A shear bolt as defined in any of paragraphs 1-4, wherein the notch is formed in a plane that intersects the main axis at an angle of between 30 and 150 degrees.

6. A shear bolt as defined in any of paragraphs 1-5, where a first portion of the notch on a first radial side of the main body is axially offset with respect to a second portion of the groove on a second radial side of the main body.

7. A shear bolt as defined in any of paragraphs 1-6, further comprising a first flat face axially extending from the shear region away from the head; and a second flat face axially extending from the shear region away from the head, the second flat face radially spaced form the first flat face.

8. A shear bolt as defined in any of paragraphs 1-7, wherein the shear region comprises a first notch formed on a first side of the shaft; and a second notch formed on a section side of the shaft, the first and second notches being axially offset with respect to one another.

9. A shear bolt as defined in any of paragraphs 1-8, wherein the shear bolt forms part of a whipstock assembly.

10. A downhole assembly, comprising a mill providing one or more blades; a downhole tool; and a shear bolt coupling the mill to the downhole tool, the shear bolt having a head and a shaft extending from the head and defining a central axis, the shaft including a shear region having a reduced cross-sectional area axially spaced from the head and lying in a plane orthogonal to the central axis, the cross-sectional area having a profile including a first width in a first direction; and a second width, less than the first width, in a second direction orthogonal to the first direction.

11. A downhole assembly as defined in paragraph 10, wherein the cross-sectional area of the shear region at the first width comprises a first shear limit to withstand a force applied in the first direction; and the cross-sectional area of the shear region at the second width comprises a second shear limit, lower than the first shear limit, to withstand a force applied in the second direction.

12. A downhole assembly as defined in paragraphs 10 or 11, wherein the shear region comprises a circumferential notch formed in the shaft.

13. A downhole assembly as defined in any of paragraphs 10-12, wherein the notch partially extends around the shaft.

14. A downhole assembly as defined in any of paragraphs 10-13, wherein the notch is formed in a plane that intersects the main axis at an angle of between 30 and 150 degrees.

15. A downhole assembly as defined in any of paragraphs 10-14, where a first portion of the notch on a first radial side of the main body is axially offset with respect to a second portion of the groove on a second radial side of the main body.

16. A downhole assembly as defined in any of paragraphs 10-15, further comprising a first flat face axially extending from the shear region away from the head; and a second flat face axially extending from the shear region away from the head, the second flat face radially spaced form the first flat face.

17. A downhole assembly as defined in any of paragraphs 10-16, the shear region comprises a first notch formed on a first side of the shaft; and a second notch formed on a section side of the shaft, the first and second notches being axially offset with respect to one another.

The foregoing disclosure may repeat reference numerals and/or letters in the various examples. This repetition is for the purpose of simplicity and clarity and does not in itself dictate a relationship between the various embodiments and/or configurations discussed. Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the apparatus in use or operation in addition to the orientation depicted in the figures. For example, if the apparatus in the figures is turned over, elements described as being "below" or "beneath" other elements or features would then be oriented "above" the other elements or features. Thus, the illustrative term "below" can encompass both an orientation of above and below. The apparatus may be otherwise oriented (rotated 90 degrees or at other orientations) and the spatially relative descriptors used herein may likewise be interpreted accordingly.

Although various embodiments and methods have been shown and described, the invention is not limited to such embodiments and methods and will be understood to include all modifications and variations as would be apparent to one skilled in the art. Therefore, it should be understood that the invention is not intended to be limited to the particular forms disclosed. Rather, the intention is to cover all modifications, equivalents and alternatives falling within the spirit and scope of the invention as defined by the appended claims.

What is claimed is:

1. A shear bolt, comprising:
a head; and
a shaft extending from the head and defining a central axis, the shaft having a shear region comprising a reduced cross-sectional area axially spaced from the head and lying in a first plane orthogonal to the central axis, the cross-sectional area having a profile including:
a first width in a first direction; and
a second width, less than the first width, in a second direction orthogonal to the first direction, and
wherein the reduced cross sectional area of the shear region comprises a circumferential notch formed in a main body the shaft, where a first portion of the circumferential notch on a first radial side of the main body is axially offset with respect to a second portion of the circumferential notch on a second radial side of the main body.

2. A shear bolt as defined in claim 1, wherein:
the cross-sectional area of the shear region at the first width comprises a first shear limit to withstand a first force applied in the first direction; and
the cross-sectional area of the shear region at the second width comprises a second shear limit, lower than the first shear limit, to withstand a second force applied in the second direction.

3. A shear bolt as defined in claim 1, wherein the notch partially extends around the shaft.

4. A shear bolt as defined in claim 1, wherein the notch is formed in a second plane that intersects the central axis at an angle of between 30 and 150 degrees.

5. A shear bolt as defined in claim 1, further comprising:
a first flat face axially extending from the shear region away from the head; and a second flat face axially extending from the shear region away from the head, the second flat face radially spaced form the first flat face.

6. A shear bolt as defined in claim 1, wherein the shear bolt forms part of a whipstock assembly.

7. A downhole assembly, comprising:
a mill providing one or more blades;
a downhole tool; and
a shear bolt coupling the mill to the downhole tool, the shear bolt having a head and a shaft extending from the head and defining a central axis, the shaft including a shear region having a reduced cross-sectional area axially spaced from the head and lying in a first plane orthogonal to the central axis, the cross-sectional area having a profile including:
a first width in a first direction; and
a second width, less than the first width, in a second direction orthogonal to the first direction, and
wherein the shear region comprises a circumferential notch formed in a main body of the shaft, and wherein a first portion of the notch on a first radial side of the main body is axially offset with respect to a second portion of the notch on a second radial side of the main body.

8. A downhole assembly as defined in claim 7, wherein:
the cross-sectional area of the shear region at the first width comprises a first shear limit to withstand a first force applied in the first direction; and the cross-sectional area of the shear region at the second width comprises a second shear limit, lower than the first shear limit, to withstand a second force applied in the second direction.

9. A downhole assembly as defined in claim 7, wherein the notch partially extends around the shaft.

10. A downhole assembly as defined in claim 7, wherein the notch is formed in a second plane that intersects the central axis at an angle of between 30 and 150 degrees.

11. A downhole assembly as defined in claim 7, further comprising:
- a first flat face axially extending from the shear region away from the head; and
- a second flat face axially extending from the shear region away from the head, the second flat face radially spaced form the first flat face.

12. A shear bolt, comprising:
- a head; and
- a shaft extending from the head and defining a central axis, the shaft having a shear region comprising a reduced cross-sectional area axially spaced from the head and lying in a plane orthogonal to the central axis,
- the shear region including:
  - a first notch formed on a first side of the shaft; and
  - a second notch formed on a second side of the shaft, the first and second notches being axially offset with respect to one another, and
- the cross-sectional area having a profile including:
  - a first width in a first direction; and
  - a second width, less than the first width, in a second direction orthogonal to the first direction.

* * * * *